(12) United States Patent
Melander et al.

(10) Patent No.: US 9,148,451 B2
(45) Date of Patent: Sep. 29, 2015

(54) PROVIDING CIRCUIT SWITCHED CALLS AND SERVICES OVER A BROADBAND NETWORK

(75) Inventors: Ola Melander, Wuerselen (DE); Joerg Christian Ewert, Aachen (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 580 days.

(21) Appl. No.: 13/130,724

(22) PCT Filed: Nov. 24, 2008

(86) PCT No.: PCT/EP2008/066091
§ 371 (c)(1),
(2), (4) Date: Aug. 31, 2012

(87) PCT Pub. No.: WO2010/057538
PCT Pub. Date: May 27, 2010

(65) Prior Publication Data
US 2012/0314662 A1     Dec. 13, 2012

(51) Int. Cl.
*H04L 29/06*     (2006.01)

(52) U.S. Cl.
CPC ........ *H04L 65/1016* (2013.01); *H04L 65/1073* (2013.01)

(58) Field of Classification Search
CPC ... H04W 28/04; H04W 72/04; H04W 72/042; H04W 88/08; H04L 5/0007; H04L 29/06027; H04L 29/06326; H04L 29/06; H04L 12/66; H04M 7/006
See application file for complete search history.

(56) References Cited

U.S. PATENT DOCUMENTS

| | | | |
|---|---|---|---|
| 6,788,676 B2 * | 9/2004 | Partanen et al. | 370/352 |
| 6,839,356 B2 * | 1/2005 | Barany et al. | 370/401 |
| 6,888,821 B2 * | 5/2005 | Rasanen et al. | 370/352 |

(Continued)

FOREIGN PATENT DOCUMENTS

| | | |
|---|---|---|
| EP | 1744569 A1 | 1/2007 |
| EP | 1909438 A1 | 4/2008 |
| WO | 2007009298 A1 | 1/2007 |

OTHER PUBLICATIONS

3GPP TS 24.229, titled "Technical Specification Group Core Network and Terminals, IP Multimedia Call Control Protocol based on Session Initiation Protocol (SIP) and Session Description Protocol (SDP); V6.19.0, Stage 3, Release 6," was published as Technical Specification by 3rd Generation Partnership Project on Sep. 2008, pp. 01 through 309.*

(Continued)

*Primary Examiner* — Andrew Lai
*Assistant Examiner* — Hoyet H Andrews
(74) *Attorney, Agent, or Firm* — Coats & Bennett, PLLC

(57) ABSTRACT

The present invention is directed to a method, a switching server, a terminal device and system for providing circuit switched calls and services to terminal devices connected to a switching server via an IP Multimedia Subsystem. The method comprises a step of providing (S120) a first interworking entity (330) in the terminal device (300) for interworking between circuit switched signalling messages and signalling messages related to packet switched sessions towards the IMS (30). The method further comprises providing (S130) a second interworking entity (230) in the switching server (200) towards the IMS (30). The terminal device (300) is thus capable of accessing circuit switched calls and services directly from the switching server (200).

31 Claims, 12 Drawing Sheets

(56) References Cited

U.S. PATENT DOCUMENTS

| | | | | |
|---|---|---|---|---|
| 7,212,810 | B2* | 5/2007 | Babbar et al. | 455/414.1 |
| 7,283,506 | B2* | 10/2007 | Mayer et al. | 370/338 |
| 7,356,345 | B2* | 4/2008 | Cunningham et al. | 455/466 |
| 7,366,514 | B2* | 4/2008 | Ejzak | 455/436 |
| 7,400,881 | B2* | 7/2008 | Kallio | 455/412.2 |
| 7,408,887 | B2* | 8/2008 | Sengupta et al. | 370/252 |
| 7,539,160 | B2* | 5/2009 | Virtanen et al. | 370/329 |
| 8,089,956 | B2* | 1/2012 | Gu et al. | 370/354 |
| 8,358,647 | B2* | 1/2013 | Mahdi et al. | 370/352 |
| 2005/0195762 | A1* | 9/2005 | Longoni et al. | 370/328 |
| 2007/0121608 | A1* | 5/2007 | Gu et al. | 370/356 |
| 2007/0195754 | A1* | 8/2007 | Shaheen | 370/352 |
| 2010/0046499 | A1 | 2/2010 | Hu et al. | |
| 2010/0067493 | A1* | 3/2010 | Mahdi | 370/332 |
| 2010/0069101 | A1* | 3/2010 | Mahdi et al. | 455/466 |

OTHER PUBLICATIONS

3GPP TS 24.237, titled "Technical Specification Group Core Network and Terminals, IP Multimedia (IM) Core Network (CN) subsystem, IP Multimedia Subsystem (IMS) Service Continuity, V1.0.0, Stage 3 (Release 8)," was published as Technical Specification by 3rd Generation Partnership Project on Sep. 2008, pp. 01 through 39.*

Rebeiro-Hargrave, A. and Viamonte Solé, D. (2008) Front Matter, in Multimedia Group Communication: Push-to-Talk Over Cellular, Presence and List Management Concepts and Applications, John Wiley & Sons, Ltd, Chichester, UK. doi: 10.1002/9780470060476. fmatter Published Online: Feb. 29, 2008 Published Print: Feb. 8, 2008.*

3GPP TS 24.229, titled "Technical Specification Group Core Network and Terminals, IP Multimedia Call Control Protocol based on Session Initiation Protocol (SIP) and Session Description Protocol (SDP); V6.19.0, Stage 3, Release 6," was published as Technical Specification by 3rd Generation Partnership Project on Sep. 2008 p. 01-309.*

3GPP TS 23.228, titled "Technical Specification Group Services & System Aspects, IP Multimedia Subsystem (IMS); V8.6.0, Stage 2, Release 8," (3GPP 23228 hereinafter) was published as Technical Specification by 3rd Generation Partnership Project on Sep. 2008, pp. 01 through 233.*

3GPP TR 23.882, titled "Technical Specification Group Services & System Aspects, 3GPP System Architecture Evolution; Report on Technical Options and Conclusions; V2.0.0, Release 8," (3GPP 23882 hereinafter) was published as Technical Specification by 3rd Generation Partnership Project on Sep. 2008, pp. 01 through 236.*

3GPP TS 23.206, titled "Technical Specification Group Services & System Aspects, Voice Call Continuity (VCC) between Circuit Switched (CS) and IP Multimedia Subsystem (IMS); V7.5.0, Stage 2 Release 7," (3GPP 23206 hereinafter) was published as Technical Specification by 3rd Generation Partnership Project on Dec. 2007, pp. 01 through 36.*

3GPP TS 22.101, titled "Technical Specification Group Services & System Aspects Service aspects Service principles, V9.1.0, (Release 9)," (3GPP 22101 hereinafter) was published as Technical Specification by 3rd Generation Partnership Project on Sep. 2008, pp. 01 through 54.*

3GPP TS 23.218, titled "Technical Specification Group Services & System Aspects, Combined Circuit Switched (CS) and IP Multimedia Subsystem (IMS) sessions, V8.3.0, Stage 2 (Release 8)," (3GPP 23218 hereinafter) was published as Technical Specification by 3rd Generation Partnership Project on Sep. 2008, pp. 01 through 65.*

3GPP TS 24.237, titled "Technical Specification Group Core Network and Terminals, IP Multimedia (IM) Core Network (CN) subsystem, IP Multimedia Subsystem (IMS) Service Continuity, V1.0.0, Stage 3 (Release 8)," (3GPP 24237 hereinafter) was published as Technical Specification by 3rd Generation Partnership Project on Sep. 2008, pp. 01-39.*

3GPP TS 22.279, titled "Technical Specification Group Services & System Aspects, Combined Circuit Switched (CS) and IP Multimedia Subsystem (IMS) sessions, V7.1.0, (Release 7)," (3GPP 22279 hereinafter) was published as Technical Specification by 3rd Generation Partnership Project on Dec. 2005, pp. 01 through 15.*

3GPP TS 24.229, titled "Technical Specification Group Core Network and Terminals, IP Multimedia Call Control Protocol based on Session Initiation Protocol (SIP) and Session Description Protocol (SDP); V6.19.0, Stage 3, Release 6,".*

3GPP TS 23.279, titled "Technical Specification Group Services & System Aspects, Combining Circuit Switched (CS) and IP Multimedia Subsystem (IMS) services; V8.1.0, Stage 2 Release 8," (3GPP 23279 hereinafter) was published as Technical Specification by 3rd Generation Partnership Project on Sep. 2007, pp. 01 through 35.*

3GPP TR 23.879, titled "Technical Specification Group Services & System Aspects, Study on Circuit Switched(CS) domain Services over evolved Packet Switched (PS) access; V1.0.0, Stage 2 Release 8," (3GPP 23879 hereinafter) was published as Technical Report by 3rd Generation Partnership Project on Dec. 2007, pp. 01 through 40.*

European Telecommunications Standards Institute. ETSI TS 124 206, V7.3.0 (Oct. 2007), Digital cellular telecommunications system (Phase 2+); Universal Mobile Telecommunications System (UMTS); Voice call continuity between Circuit Stitched (CS) and IP Multimedia Subsystem (IMS); Stage 3 (3GPP TS 24.206 version 7.3.0 Release 7). Oct. 2007.

European Telecommunications Standards Institute. ETSI TS 124 008, V7.3.0 (Mar. 2006), Digital cellular telecommunications system (PHate 2+); Universal Mobile Telecommunications System (UMTS); Mobile radio interface Layer 3 specification; Core network protocols; Stage 3 (3GPP TS 24.008 version 7.3.0 Release 7). Mar. 2006.

* cited by examiner

1. Simple MSC-S based VoIP

New Mobile terminating signaling flow (1/2)

New Mobile terminating signaling flow (2/2)

PROVIDING CIRCUIT SWITCHED CALLS AND SERVICES OVER A BROADBAND NETWORK

TECHNICAL FIELD

The present invention relates to communications in a network and more particularly to a method for providing circuit switched calls or services from a switching server to a terminal device connected via a broadband network, to a switching server arranged for handling circuit switched calls or services and for interfacing with a terminal connected via a broadband network, to a communication device for providing services to a user and to a system for providing services, like circuit switched calls and services, to a terminal device connected to a switching server via a broadband network.

BACKGROUND

In the field of communications over a network it has become widespread the use of packet switched services over broadband access networks, which are typically packet switched networks. One service which has become increasingly popular is the transmission of voice over packets, according for instance to the Voice over Internet Protocol, VoIP. The problem of interworking between VoIP services and existing circuit switched voice calls provided in existing circuit switched networks is typically solved by means of interworking nodes specifically implemented in the network. Thanks to the interworking, users of packet switched voice services over packet switched networks can interoperate also with users of traditional circuit switched voice services.

More recently, network operators and users have experienced an increased need of making also circuit switched calls or packet switched network. In other words, on one side there is the problem of interworking packet switched services such as VoIP with circuit switched networks, while on the other side it has become important offering circuit switched calls and services to packet switched users.

Through the deployment of low cost fixed broad band accesses and increased backbone network capacity, voice has turned from a niche Voice over IP application into a key service enabled by IP networks. This is especially visual through VoIP implementations like Skype.

Skype hereby imitates and enhances (video, presence, . . . ) the traditional circuit switched voice service for calls inside the IP network. In order to interwork with the traditional circuit switched voice service, Skype deploys gateways, which mediate between the Skype voice service and the circuit switched voice service. The ease of installation, the look and feel, the "good enough" voice quality and the low usage fees have been instrumental for Skype's success.

At the same time, the mobile voice access continues to be dominated by the traditional circuit switched mobile system, like the mobile soft switch. The mobile soft switch is a network entity for controlling a variety of functions in relation to communications within the network. The soft switch may be comprised in one physical device but is typically distributed over several physical devices in order to partition the distribution of functionalities within the network. With soft switch it is made reference to network entities such as exemplarily comprised in network architectures according to 3GPP specifications, see e.g. TS 23.002. Mobile service providers in developed countries continue to achieve 50-90% of their income through the mobile voice service and do not have any incentive to move away from the mobile voice service. On emerging markets the infra-structure for fixed broad band accesses is usually not available, nor economically feasible. This makes the mobile circuit switched networks the prime choice for deploying voice services.

Wireless and mobile broadband accesses capable of carrying voice are now emerging through WLAN, WiMAX, HSPA, LTE. This gradually enables fixed type of VoIP services like Skype to be available also in a wireless and mobile environment. Telecom industry has developed the Internet Protocol Multimedia Standard (IMS) to handle services enabled by the increasingly broad band access networks. The multi media telephony service (MMtel) is also present and targeting the VoIP markets. IMS systems are however not yet broadly deployed.

Today a user can either use a narrow band traditional circuit voice through a wireline or mobile phone, or a lower cost broad band access VoIP service. The advantage of having a low cost VoIP service also implies that the users need to make an active choice whether to use Skype, other VoIP services, mobile circuit voice or fixed circuit voice. This choice is influenced on their geographical position, the device they want to use, who they want to reach, what the other party tends to use, the length of the conversation, the price they are prepared to pay, how much money they have on their prepaid account for the service, the services they want to invoke including the kind of voice quality they want to have etc. Thus, an active choice is needed that makes the use not straightforward.

Another problem for the users is that the user experience, the quality and the services offered vary with the choice made. For example a Skype user can have excellent speech quality one day and poor quality the next day, or the service might not be available at all.

The mobile service providers in developed countries notice the new wireless and mobile broadband accesses that now occur. There is an understanding that a certain amount of voice traffic will migrate from the circuit networks to the VoIP services. Today mobile service providers have limited means to benefit from the transition to VoIP. There is an expectation that IMS can play a future role in this, but proprietary implementation like Skype dominate as they are available already today. An uncontrolled voice migration would mean that large parts of the operators' income disappear.

Mobile service providers in developing countries want to secure that the investments in today's voice infrastructure can be used for a long time. A scenario where wireless and mobile broadband are added rapidly and rapid voice migration happens will discourage current voice infra structure investments.

Mobile and fixed service providers that embrace proprietary VoIP technologies, like Skype, for use in broadband networks face a number of challenges. Skype-like networks are in essence networks of their own that need to be built from scratch. This means that all aspects that have been developed and optimized over more than 100 years in circuit voice networks need to be re-implemented in the new VoIP networks. It is technically challenging, and thus also costly, to maintain a high availability VoIP service (in service performance, capacity, scalability, etc) and compliance to market and regulatory aspects in VoIP networks (market specific services, charging, monitoring, interconnect, etc). A further problem is that the gateways required for connecting proprietary VoIP networks, like Skype, to traditional voice circuit networks emulate functionality. This creates a significantly different look and feel for the VoIP users as compared for example to 2 GSM subscribers having a voice conversation.

Mobile and fixed service providers that embrace the IP Multi Media (IP MM) system face a similar situation as when wanting to deploy proprietary VoIP technologies broadly. This is due to today's limited deployment of IP MM and the need for gateways for inter-working scenarios.

Mobile and fixed service providers that enhance existing circuit switching voice equipment to support native SIP based VoIP services also face several challenges. SIP client access security either needs to be implemented directly in the switching nodes or access nodes that interwork between the accesses and switching nodes need to be introduced. Interworking between SIP based VoIP and circuit switched need to be defined and implemented with capability loss as a consequence. Network scalability and stability need to be solved too. Thus, a series of problems are still open.

Attempts are known in the art for connecting broad band accesses to existing mobile voice networks by placing a proprietary BSC/RNC emulation node between the broad band access and the mobile soft switch. Although there is interest from leading mobile service providers, the solution is not yet proven. Furthermore, it is a single source solution, introduces additional complexity to the network and faces the previously mentioned availability and scalability challenges.

It is also known in the art a communication node which is added to a known communication network for interfacing between a mobile switching server and one or more different access networks. The additional network device performs the interworking between services provided over a broadband access network and a mobile switching centre or between services provided over an INS network and a mobile switching server. It is remarked that this known solution performs an interworking on a network to network interface. However, also this known solution suffers from at least the same problems as above mentioned. For instance, the interworking causes the loss of functionalities since during the interworking process some functionalities may get lost due to the impossibility to convert or adapt all the native functionalities of one service into the functionalities of a different service. Furthermore, this solution adds to the complexity of a network and to its maintenance since it adds one more component to the whole network. At the same time, low reliability and low scalability of the known solution are still a problem.

SUMMARY OF THE INVENTION

An object of the invention is to achieve improvements over the known techniques for providing circuit switched services to terminal devices connected to a circuit switched network via the broadband network like the Internet Protocol Multimedia Subsystem.

According to a first embodiment of the present invention, a method is disclosed for providing services in a communication network. With the term service we refer to a broad range of services that can be provided in a communication network like for instance calls, calls related services such as call forwarding, call waiting, etc. . . . . Services comprise also massaging services over communication networks, of which SMS is a specific example in GSM network, or data services which can be transmitted over circuit switched networks or over packet switched networks.

The communication network wherein the method of the invention is performed typically comprises a switching server, an Internet Protocol Multimedia Subsystem (all IMS) and one or more circuit switched access systems. The internet multimedia subsystem is an architecture or framework for providing services to mobile or fixed users as known in the art. Since the IMS represents an architecture for providing services, it is not restricted to the specific network which is used for providing said services or for providing access to a terminal using said services. In fact, the IMS comprises a variety of wireless networks like GSM, UMTS or LTE just to name some examples, but can comprise also fixed networks like all POTS, ISDN, etc. . . . . The mobile terminal, furthermore, is not restricted to a wireless mobile terminal but can be any movable terminal which is capable of being connected to a network through a cable or through a wireless connection. Examples of mobile terminals are a portable computer, a PDA or any other kind of electronic device having a network connection.

The above mentioned circuits switched access systems comprised in the communication network are not limited to any particular example of access networks but include all kind of fixed and wireless access networks which allow a terminal to access a network and establish. Examples of fixed access network are the POTS, ISDN, ADSL, cable accesses, cable modem networks, etc. . . . . Although in the following ADSL will be used as an example it is merely a placeholder for any kind of fixed broadband access such as ADSL, SDSL, VDSL, cable, etc. . . . . Examples of wireless access networks comprise GSM, GPRS, UMTS, LTE, COMA and evolutions thereof, etc. . . . .

The switching server comprised in the communication network is a network entity responsible for handling circuit switched services and circuit switched connections over which said services are typically delivered. The switching server comprises an access call control entity that is arranged for handling one or both of circuit switched calls and services. The circuit switched calls and services comprise circuit switched calls and services, of which examples are: messaging services, like SMS as provided in GSM networks, call related services, fax related services, data related services, and all kind of services that deliver voice, data or any type of information to the user. The circuit switched calls and services are provided over circuit switched connections to terminals connected to the switching server via one or more of said circuit switched access systems. Circuit switched signalling messages are typically used for controlling the connections. The switching server may be implemented as an independent network or may be comprised in other network entity. For instance, the switching server may be located in a mobile switching centre server (MSC-S) or may be part of a mobile soft switch or may be comprised in a telephone soft switch (TSS).

The method of the present invention is for further providing one or both of circuit switched calls and services from the communication network to a terminal device connected to the switching server via the Internet Protocol Multimedia Subsystem, by performing steps as detailed in the following.

The method foresees providing the terminal device with a service providing entity which is arranged for making available to a user one or both of the circuit switched calls and services by means of the circuit switched signalling messages related to circuit switched connections. In other words, the terminal is provided with suitable functions that allow a user connected to the switching server to use the circuit switched calls or services which are typically made available by the switching server.

The method further comprises a step of providing a first interworking entity in the terminal device for interworking between the circuit switched signalling messages towards the access call control entity and signalling messages related to packets switched sessions towards the Internet Protocol Multimedia Subsystem. In other words, the terminal device is provided with suitable interworking functions that allow the interworking or adaptation between circuit switched signalling messages, which are typically handled by the switching server through the access call control entity therein included, and signalling messages that the terminal device typically exchanges in relation to packets sessions within the Internet Protocol. Multimedia Subsystem.

The method further includes a step of providing a second interworking entity in the switching server between the Internet Protocol Multimedia Subsystem and the access call control entity. In other words, the second interworking entity is adapted to communicate with the Internet Protocol Multimedia Subsystem on one side and on the other side with the access call control entity. The second interworking entity is arranged for interworking between signalling messages related to packet switched sessions towards the Internet Protocol Multimedia Subsystem and circuit switched signalling messages towards the access call control entity. The second interworking entity is arranged to perform the interworking inversely to the first interworking entity. In other words, the second interworking entity comprises suitable functions for interworking between signalling messages related to packet switched sessions and circuit switched signalling messages. The second interworking entity thus performs the inverse interworking or the inverse adaptation as the one performed by the first interworking entity.

The method further foresees a step of establishing a packet switched session terminated by the first and second interworking entities. In other words, the terminal device is able to connect to the switching server through a packet switched session which is terminated by the first interworking entity comprised in the terminal device and the second interworking entity comprised in the switching server.

The method further comprises a step of providing one or both of a circuit switched call and service from the access call control entity arranged for circuit switched connections to the service providing entity comprised in the terminal device via the first and second interworking entities. In other words, a circuit switched call or service as typically provided from the access call entity of the switching server is provided to the user of the terminal device through the first and second interworking entities which are arranged for performing the interworking and the inverse interworking as needed.

It is noted that the steps of the method do not need to be performed in the order above described rather. In fact, any other possible order of said steps is also suitable for performing the method as long as each of said steps is performed once.

According to a further embodiment of the invention, it is provided a switching server for a communication network, wherein the communication network comprises an Internet Protocol Multimedia Subsystem (IMS) and one or more circuit switched access systems. The same considerations made with reference to the embodied method of the invention with reference to the IMS and to the circuit switched access systems also apply for the embodied switching server. The switching server is arranged for terminating sessions with the Internet Protocol Multimedia Subsystem and further comprises a signalling entity and an interfacing entity.

The signalling entity is for exchanging through an access side circuit switched signalling messages related to circuit switched connections with terminals communicating via said one or more circuit switched access systems. In other words, the signalling entity is capable of exchanging circuit switched signalling messages with terminals connected through a circuit switched access system. The access side of the signalling entity represents a part or an interface of the signalling entity which is suitable for exchanging the circuit switched signalling messages. The circuit switched signalling messages are signalling messages associated to circuit switched connections. There are for example signalling messages needed for establishing or releasing calls or for handling other type of services such as SMS services. The access call control entity of the switching server is arranged for handling one or both of circuit switched calls and services provided over the circuit switched connections to the terminals by means of the signalling entity. In other words, the access call control entity comprises suitable functions related to handling connections for providing calls or services over circuit switched connections. The call control entity interacts with the signalling entity, which provides the necessary signalling messages. The access call control entity further comprises a network side for interworking with other communication networks. In other words, the switching server is adapted to exchange signalling messages with users of terminal devices over the access side of the signalling entity, e.g. over a user network interface (UNT), and is further adapted to interwork with other communication networks over a separate and distinct network side comprised in the access call control entity, e.g. over a network to network interface (NNI).

The switching server further comprises an interfacing entity for interfacing between an access side of the signalling entity and a terminal connected to the switching server via the Internet Protocol Multimedia Subsystem. The interfacing entity is further arranged to interwork between a circuit switched signalling messages for circuit switched connections vis-à-vis the signalling entity and signalling messages for packet switched sessions vis-à-vis the terminal connected to the switching server via the Internet Protocol Multimedia Subsystem. In other words, the interfacing entity interfaces a terminal connected to the switching server via the Internet Protocol Multimedia Subsystem and the access side of the signalling entity above described. The interfacing entity then performs the interworking between the circuit switched signalling messages handled by the switching server through the signalling entity and signalling messages towards and from the terminal connected to the switching server through the Internet Protocol Multimedia Subsystem, wherein the signalling messages exchanged with the terminal relate to packet switch sessions.

In a further embodiment of the present invention, it is provided a communication device for providing services to a user, wherein the services can be of any kind as indicated with reference to the method embodying the invention. The communication device is adapted to access a switching server via an Internet Protocol Multimedia Subsystem and comprises a service providing unit, a session terminating unit and an interworking unit.

The service providing unit makes circuit switched telephone services available to a user by means of circuit switched signalling messages related to circuit switched connections. In other words, the service providing unit implements suitable functions in a communication device such that the user of the communication device can make use of those services typical of circuit switched connection networks and which are typically handled by means of circuit switched signalling messages.

The session terminating unit is adapted to terminate signalling messages related to packet switched sessions.

The interworking unit is adapted to interwork between circuit switched signalling messages related to circuit switched messages towards the service providing unit and signalling messages related to packet switched sessions towards the sessions terminating unit. In other words, the interworking unity can be considered as a unit adapted to interwork between the circuit switched messages handled by the service providing unity and the signalling messages related to packet switched sessions which are instead handled by the section terminating unit.

According to another embodiment of the present invention, it is provided a system for providing services in a communication network, wherein the communication network comprises an Internet Protocol Multimedia Subsystem and one or more circuit switched access systems. The system comprises a switching server and a terminal device.

The switching server includes an access call control entity arranged for handling one or both of circuit switched calls and services provided over circuit switched connections by means of circuit switched signalling messages to terminals connected to the switching server via one or more of the circuit switched access systems. In other words, the switching server is able to provide through the access call control entity circuit switched calls or services to terminals connected to the switching server via a circuit switched access system.

The terminal included in the system is connected to the switching server via the Internet Protocol Multimedia Subsystem. The communication network is further adapted to provide one or both of the circuit switched calls and services to the terminal device. In other words, the communication network is suitable for providing circuit switched calls or services to terminals connected to the switching service via a circuit switched access systems and at the same time is suitable for providing circuit switched calls or services to terminal devices connected to the switching server through an Internet Protocol Multimedia Subsystem, therefore to terminal devices which can be connected over packet switched access networks.

The terminal device of the system further comprises a service providing entity for making available to a user one or both of the circuit switched calls and services by means of the circuit switched signalling messages related to circuit switched connections; and a first interworking entity for interworking between the circuit switched signalling messages towards the access call control entity and signalling messages related to packet switched sessions towards the Internet Protocol Multimedia Subsystem. In other words, the terminal device comprises suitable functions for making available to a user circuit switched calls or services; the first interworking entity is for interfacing the circuit switched signalling messages, associated to the circuit switched calls or services, with the signalling messages related to packet switched sessions, which are associated with packet switched session within the Internet Protocol Multimedia Subsystem.

The switching server of the system further comprises a second interworking entity between the Internet Protocol Multimedia Subsystem and the access call control entity, wherein the second interworking entity is arranged for interworking between signalling messages related to packet switched sessions towards the Internet Protocol Multimedia Subsystem and circuit switched signalling messages towards the access call control entity, inversely to the first interworking entity. In other words, the switching server comprises a second interworking entity which performs the interworking which is inversed to the interworking performed by the first interworking entity of the terminal device.

In the system embodying the invention, the terminal device and the switching server comprise respective controller entities for establishing a packet switched session terminated by the first and second interworking entities, and for providing one or both of a circuit switched call and service from the access call control entity arranged for circuit switched connections to the service providing entity in the terminal device via the first and second interworking entities. In other words, the terminal device and the switching server are adapted to establish a packet switched session between themselves by means of the first and second interworking entities and are arranged such that circuit switched call and services are directly provided from the switching server to the terminal device through the first and second interworking entities.

Further advantageous embodiments of the invention are defined in the dependent claims.

One of the advantages provided by the invention consists in that service providers with switching server installations, such as existing Mobile Soft Switch installation or telephone Soft Switch installations, are able to expand the voice service offering to broadband accesses. Furthermore, this can be achieved without the need of additional network nodes.

A further advantage of the invention consists in that the terminal device accessing the switching server already implements all the functions needed for making available to a user the circuit switched calls and services. For example, this may be achieved by implementing the same functions or the same programming interface typical of a circuit switched terminal device in a broadband terminal device. The user would then have access to the circuit switched calls and services directly from the terminal device connected through the Internet Protocol Multimedia Subsystem. This implies that all the functionalities of the circuit switched calls and services are available at the user's side and there is no risk of loosing any functionality due to interwork in the network.

There is the further advantage that the user's look and feel when making use of the circuit switched calls and services is safeguarded. For example, the user of a terminal device making a call by accessing the switching server through an IMS would have the same look and feel as compared with GSM subscribers having a voice conversation.

The present invention further obviates at least some of the disadvantages of the prior art as for instance above explained, and provides an improved method, switching server, communication device and system for providing services in a communication network.

DETAILED DESCRIPTION

In the following, preferred embodiments of the invention will be described with reference to the figures. It is noted that the following description contains examples that serve to better understand the claimed concepts, but should not be construed as limiting the claimed invention.

Figure 1:
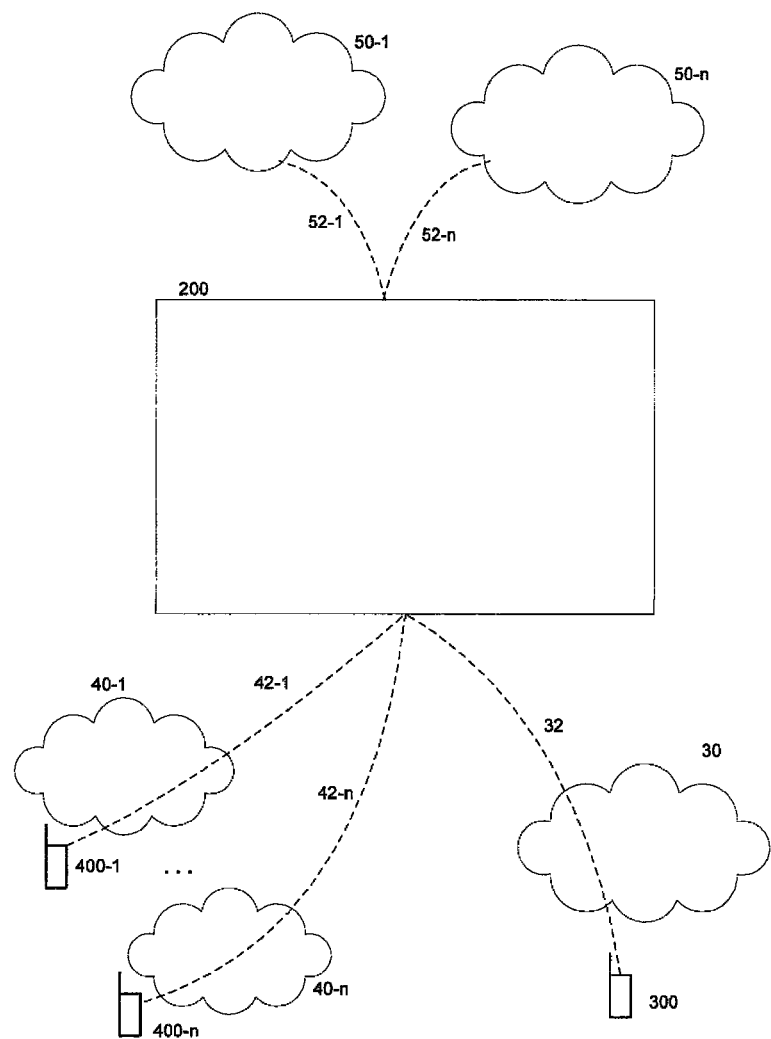
FIG. 1 is a block functional diagram of an example of a communication network to which the present invention may be applied.

The block functional diagram of FIG. 1 illustrates an example of a communication network to which the present invention may be applied.

The communication network 10 comprises a communication network denoted with reference sign 30 being an Internet Protocol Multimedia Subsystem (INS). As known in the art, an Internet Protocol Multimedia Subsystem is an architectural framework for delivering IP services to mobile and fixed users. This architecture is typically partitioned into a transport layer, for carrying voice and data traffic, a control layer, for carrying related signalling, and the service and/or application layer, for providing services and/or applications to users. The architecture further comprises access networks, core networks, inter connections, interworking entities and other network related subsystems or entities for handling a variety of users and/or network services (e.g. billing, network management, operation and maintenance, etc. . . . ). The IMS is not limited to a particular kind of core network or to a particular kind of access network, but can be any combination of existing core networks and existing access networks. For instance, the access networks part of the Internet Protocol Multimedia Subsystem can be fixed, like POTS, r ISDN, ADSL, cable accesses, cable modem networks, or wireless, like GSM/UMTS, LTE, CDMA or evolutions thereof, W-LAN etc. . . . . The terminal device 300 depicted in FIG. 1 is connected to the IMS network (30) and can use services delivered from or delivered through the IMS network (30).

The IMS core network is typically used to provide access integrity (client authentication, security, etc) and as a decision point whether the switching server shall be invoked or not. For this purpose no functional enhancement to the IMS core network is needed, nor is application server support required. It can also be foreseen, however, the possibility of delegating the functionalities related to authentication and/or security to other entities of the network (10).

The communication's network (10) further comprises one or more circuit switched access systems denoted with 40-1 . . . 40-N. Examples for each of said circuit switched access system can be GSM networks, UMTS networks, LTE networks, WLAN, COMA networks or thereof evolution, etc. . . . . Said circuit switched access systems are however not restricted to wireless systems but could be also fixed access networks like POTS or ISDN. As evident, the circuit switched access system 40-1 . . . 40-n need be of the same kind but may, as it is typically the case, be of different kinds and according to different standards. What is common to them is that each of the circuit switched access system comprises the capability of handling circuit switched connections and is capable of providing services to users over circuit switched connections. It is remarked that in the present application with the term service it is referred to all kind of services which are typically delivered over any communication network, like for instance calls, messaging services such as SMS text messages, fax services, data transmission, etc. . . . .

Terminal devices 400-1 . . . 400-n gain access to the network through the corresponding circuit switched access system 40-1 . . . 40-n, thus being able to make use of services delivered by or through the circuit switched access systems.

The network (10) further comprises a switching server (200) which is a network entity carrying out switching functions and management functions of connections between terminals and/or between terminals and other networks and/or between several networks. The management functions of the switching server comprise functions related to the registration or location of users, functions related to the movement of those users which are mobile, functions related to the establishment or release of connections and to the delivery of services. In general the management functions may comprise also functions for providing or interfacing with network services such as billing, operation and maintenance, network management, etc. . . . .

The communication network (10) further comprises other networks 50-1 . . . 50-n which can be any kind of core network. These networks can be any type of circuit switched networks or packet switched networks using for example ISUP, BICC, SIP-1, SIP NNI etc. . . . . The lines having reference signs 42-1 . . . 42-n and 32 are illustrative of the connections established between the corresponding terminals 400-1 . . . 400-n and 300 with the switching server (200). It is noted that the illustrative connections 42-1 . . . 42-n and 32 can be in one example signalling messages belonging to a user to network interface (UNI).

On the other side, the illustrative connections 42-1 . . . 42-n interconnect the switching server (200) with the corresponding networks 40-1 . . . 40-n, respectively, and belong in one example to a network to network interface (NNI).

Figure 2:
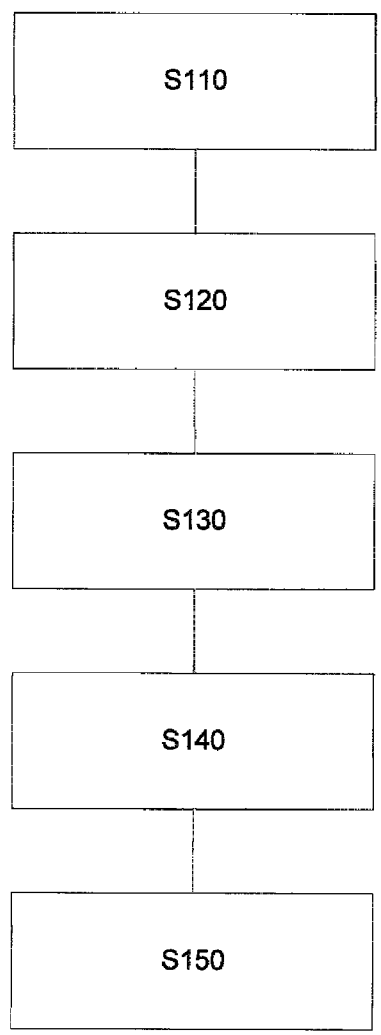
FIG. 2 is a schematic flowchart showing the steps comprised in a method according to an embodiment of the present invention.
Figure 3:
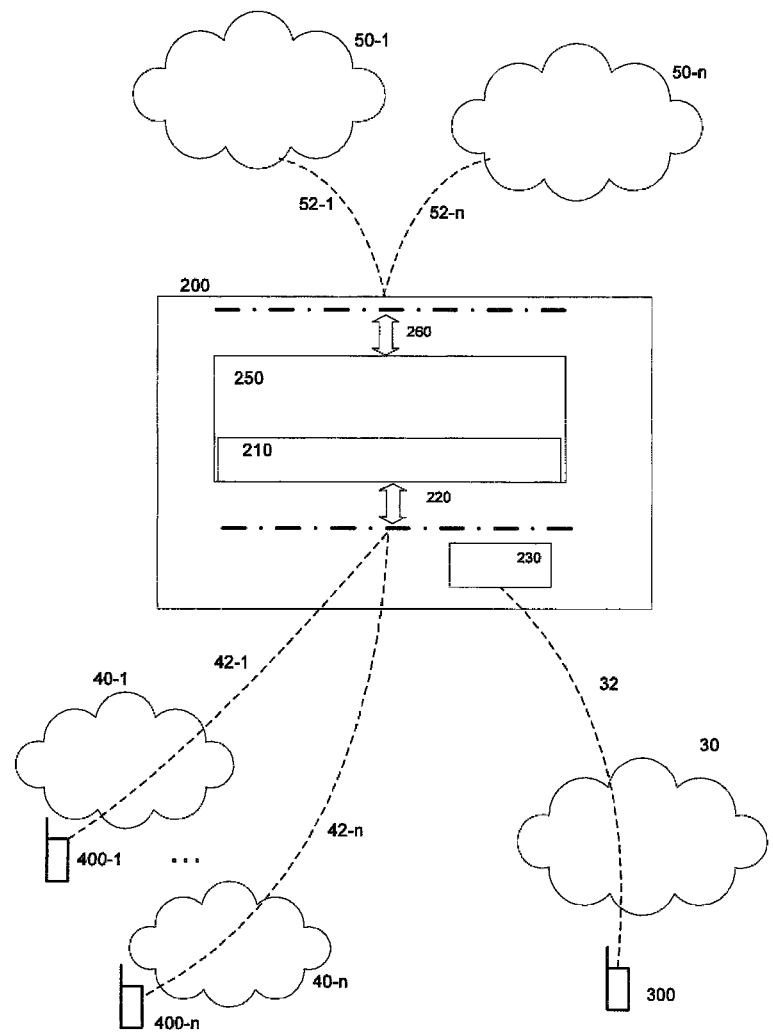
FIG. 3 is a block functional diagram illustrating some details of a switching server according to an embodiment of the present invention.

FIG. 2 illustrates a schematic flowchart comprising the steps of a method according to an embodiment of the present invention. The method of this embodiment is suitable for being carried out in a communication network as the one depicted in FIG. 1. FIG. 3 shows a switching server according to an embodiment of the present invention that can be implemented in the network depicted in FIG. 1. Namely, the communication network comprises a switching server (200), and Internet Protocol Multimedia Subsystem (30) and or more circuit switched access system (40-1 . . . 40-n). The switching server comprises an access call control entity (250) that is arranged for handling circuit switched calls and/or services. Circuit switched calls and services are provided over circuit switched connections by means of circuit switched signalling messages to terminals (400-1 . . . 400-n) that are connected to the switching server via one or more of the circuit switched access systems (40-1 . . . 40-n). The method of the present invention is also capable of providing circuit switched calls and/or services from the communication network (10) also to a terminal device (300) connected to the switching server (200) via the Internet Protocol Multimedia Subsystem (30). Typically, the terminal device (300) performs communication with the IMS according to packet switched connections as the one depicted with reference sign (32) in FIG. 1. In order to provide circuit switched calls and/or services to the terminal device (300), the method foresees a series of steps as presented in FIG. 2.

It is noted that the terminal device (300) can be any kind of device which is capable of being connected to a network either through a wired connection or through a wireless connection. For example, the terminal device (300) could be a wireless terminal performing packet switched communication with the IMS like, e.g. a wireless LAN terminal or a notebook connected to the IMS over an ADSL access network.

The method according to the present embodiment comprises a step (S110) of providing the terminal device with a service providing entity for making available to a user of the terminal device (300) circuit switched calls and/or services by using circuit switched signalling messages related to circuit switched connections. The mentioned services comprise a wide variety of services including SMS text messages, call related services like call forwarding, call waiting, data exchange services, etc. . . . . The circuit switched signalling messages are signalling messages needed for handling and managing the circuit switched connections through which the circuit switched calls and/or services are delivered. Examples are location update messages typically required by the network to monitor the state of the terminal, for instance monitoring whether the terminal is still in active mode and thus connected to the network or whether it has disconnected from a network due to any reason. The circuit switched signalling messages comprise also mobility management messages for controlling the location wherein the terminal is at the present, especially when the terminal is a mobile terminal. In GSM networks, for instance, the mobility management functions would manage the position of the mobile terminal as it moves, thus changing the cell from which it is served. The circuit switched signalling messages are however not limited to the above functionalities but may comprise further functionalities that are required for setting up, maintaining, releasing connections and for signalling ultimately needed for providing the circuit switched calls and/or services.

The method further comprises a step (S120) of providing in the terminal device (300) a first interworking entity (330). The interworking entity (330) performs interworking between the circuit switched signalling messages, which are exchanged with the access call control entity comprised in the switching server (200), and signalling messages related to packet switched sessions, which are exchanged with the Internet Protocol Multimedia Subsystem (30). The first interworking entity (330) therefore performs an adaptation between the circuit switched signalling messages and the signalling messages related to packet switched sessions. The interworking entity (330), as it will be explained in more detail in the following, achieves the mentioned adaptation by performing for instance a mapping between the circuit switched signalling messages and the signalling messages related to packet switched sessions. In a further embodiment, the adaptation can be achieved by embedding or encapsulating the circuit switched signalling messages within the signalling messages related to packet switched sessions. According to circumstances, a combination of mapping and embedding may be implemented, for instance when a method of mapping messages would not allow for a one to one correspondence of all the functionalities implemented by the signalling messages. Further embodiments may be foreseen as long as they allow an adaptation between the circuit switched signalling messages and the signalling messages associated to packet switched sessions for at least a given set of functionalities of at least one of the two signalling.

The method then comprises a further step (5130) of providing in the switching server a second interworking entity (230). The second interworking entity (230) is provided between the Internet Protocol Multimedia Subsystem (30) and the access call control entity (250) and is arranged for interworking between signalling messages related to packet switched sessions, which are carried towards, from and within the Internet Protocol Multimedia Subsystem (30), and circuit switched signalling messages, which are exchanged with the access call control entity of the switching server (200). The second interworking entity, in other words, performs an adaptation which is inverse to the adaptation performed by the first interworking entity. In one embodiment, this inverse adaptation can be performed by a method of mapping messages associated with packet switched sessions with circuit switched signalling messages, wherein the mapping used by the second interworking entity has to correspond with the mapping used by the first interworking entity in order to determine at one end the original circuit switched signalling message which was initially mapped by the interworking entity at the other end. According to another embodiment, the adaptation functionality in the second interworking entity can be achieved through a process of decapsulating or retrieving from an embedded message the circuit switched signalling messages from the signalling messages associated to packet switched sessions. In a further embodiment implementing a combination of mapping and embedding, the adaptation comprises a combination of mapping and decapsulating which corresponds to the mapping and encapsulating performed by the first interworking entity at the terminal device. Embedding and encapsulating both refer to techniques for including one message according to one protocol within a message according to another protocol. In other words, the adaptation function of the second interworking entity can be performed in several ways as long as it results in circuit switched signalling messages, exchanged through the IMS over signalling messages associated to packet switched sessions, which correspond to the circuit switched signalling messages as originally transmitted by the terminal and/or as intended to be received at the terminal device.

Other techniques for performing the adaptation by the first interworking entity and/or the second interworking entity may be foreseen, like appending messages of a first protocol to messages of a second protocol.

According to another embodiment of the present invention, the second interworking entity is adapted to interwork between user network interface circuit switched signalling messages towards the access call control entity (250) and user network interface signalling messages for packet switched sessions towards the Internet Protocol Multimedia Subsystem (30). In other words, according to this embodiment, the second interworking entity is performing adaptation of signalling from circuit switched domain to/from signalling messaged within a packet switched domain on a user network interface as the one represented by illustrative lines (42-1 . . . 42-n) and (32) in FIG. 1. It is noted that the signalling carried over the illustrative lines (52-1 . . . 52-n) relates instead to the signalling messages exchanged by the switching server (200), which is a network entity, with other networks (50-1 . . . 50-n); These signalling are therefore carried over a network to network interface (NNI). As it is known in the art, these two types of signalling messages are generally different and carry different implementation details.

The method according to the present invention comprises a further step (S140) of establishing a packet switched sessions terminated by said first and second interworking entities. As evident from the above, the established packet switched session is the one which carries the signalling messages related to the packet switched session and, indirectly by means of the interworking entities, implicitly carries circuit switched signalling messages. By making reference to the embodiment wherein the interworking is performed through message embedding, the established packet switched session carries signalling messages related to the packet switched sessions, wherein these signalling messages comprise therein embedded circuit switched signalling messages. According to the embodiment wherein the adaptation is performed by means of mapping, the packet switched session carries signalling messages related to the packet switched session which correspond to circuit switched signalling messages, however without having the content of the circuit switched signalling messages being carried within the packet switched session. Different embodiments for performing the adaptation, as described above, are implemented accordingly.

The method finally comprises a further step (S150) of providing the circuit switched call and/or services from the access call control entity, comprised in the switching server (200), to the service providing entity comprising the terminal device (300) via the first and second interworking entities. It is noted that the switching server provides the same circuit switched calls and services to terminal device (300) connected over the IMS (30) as the switching server would provide them through circuit switched connections to terminals (400-1 . . . 400-n) connected over circuit switched access system (40-1 . . . 40-n). Thanks to the method of the invention, the switching server (200) is able to deliver circuit switched calls and/or services to a terminal device (300) connected over an IMS (30) communicating over a packet switched session in the same way as it would deliver the same circuit switched calls and/or services to circuit switched terminals (400-1 . . . 400-n) connected to the switching server (200) over a circuit switched access systems (40-1 . . . 40-n) through circuit switched connections.

Therefore, the method of the invention achieves the advantage of directly providing circuit switched calls and/or services without loosing functionalities which would instead result from prior art known techniques relying on an additional interworking unit. Of course, the method of the invention provides also further advantages as described in the summary of the present invention.

It is noted that the above described steps do not need to be performed in the order herein disclosed. In fact, the method would equally work and achieve the same advantages and technical effects also when the steps are executed according to an order different from the one depicted in FIG. 2, as long as each of the steps of said method is executed at least once.

According to a further embodiment of the invention the signalling messages for packet switched sessions conform to the session initiation protocol, SIP, or to the session initiation protocol with encapsulated ISDN user part (SIP-I).

The advantage of said implementation consists in that the SIP protocol already standardized for the IMS could be readily reused without the need to implement a specific protocol. However, the invention is not limited to the SIP protocol since the use of different protocols is also possible as long as said protocol is suitable for handling signalling messages associated to packet switched sessions. Therefore, there could be situations wherein a protocol different from SIP or a modified protocol of the SIP may be implemented wherein certain functionalities or purposes want to be achieved.

In a further embodiment of the present invention, the steps of providing the switching server with corresponding entities may be performed also in those cases wherein the switching server comprises a mobile switching centre server (MSC-S) or a wireline telephony switching server. These specific embodiments will be described later in the specification, especially with reference to FIGS. 6 and 8.

In a further implementation of the above embodiment, the switching server may comprise a Soft Switch. This will be also be apparent in the following of the present specification, especially with reference to FIGS. 6 and 8.

The communication network to which the method of the present invention may be applied comprises one or more circuit switched access systems referenced with (40-1 . . . 40-n) in FIG. 1, for example. These access systems may comprise one or more among GSM, UMTS, LTE, CDMA or thereof evolutions but can also comprise a further line access network such as POTS or ISDN. According to further implementation of the method according to the present invention the access call control entity (250) applies predetermined controlled routine through circuit switched calls and/or circuit switched services which are controlled through said one or more access systems. Said controlled routines are routines for managing the connections needed for carrying the circuit switched calls and/or services and for handling and managing the circuit switched signalling messages related to the circuit switched connections for providing the circuit switched calls and/or services to terminals connected through one of said circuit switched access systems (40-1 . . . 40-n). In one example, the controlled routines implement the functionalities for establishing, maintaining and releasing connections, handling registration and/or location of the terminals, managing the mobility of terminals in those cases where the terminals are mobile, and in similar ways as also explained above in the specification. We note that mobile does not refer to wireless, but simply to the fact that a device is movable and can be connected to a network once moved. Thus, a laptop or a PDA are non limiting examples.

In this particular example of the method of the invention, the access call control entity (250) is further arranged to apply the same predetermined controlled routines through circuit switched calls and/or circuit switched services controlled via the first interworking entity and/or the second interworking entity. In other words, in this particular implementation and thanks to the step provided by the present invention, the same controlled routines which are typically used for circuit switched calls and/or services through a circuit switched access systems can be used without further modifications for handling circuit switched calls and/or services to a terminal device (300) connected to the switching server (200) over the IMS (30).

The advantage provided consists in that terminal devices accessing the switching server from a broadband network like the IMS can be served without burdensome modifications to the switching server. Thus, the core functionalities of the switching server can be used without further modifications.

The method above described achieves the advantages above mentioned as well as also at least all of the advantages already recited in the summary of the present invention.

Reference will now be made to FIG. 3 which is illustrating further details of a switching server (200) according to an embodiment of the present invention. FIG. 3 represents parts of the communication network (10) with which the switching server (200) is interfacing with the aim of giving a clear representation of one way of implementing the switching server (200) of the present invention. It is noted that, however, the entities of the network (10) interacting with the switching server (100) are not limiting features of the switching server (200). In other words, the switching server (200) alone is one embodiment of the invention.

The switching server (200) according to the present invention is suitable for being implemented in a communication network (10) which is comprising an Internet Protocol Multimedia Subsystem (30) and one or more circuit switched access systems (40-1 . . . 40-n), for which the same consideration as made with reference to FIG. 1 and to the method of the present invention are still valid. The switching server (200) further comprises a signalling entity (210) which is in turn comprised in a access call control entity (250). The signalling entity (210) is for exchanging through an access side (220) circuit switched signalling messages related to circuit switched connections with terminals (400-1 . . . 400-n)

which are communicating via one or more of the circuit switched access systems (40-1...40-*n*). The signalling entity is an entity suitable for handling a wide range of signalling for managing connections, status of users, providing services, etc. . . . . The same considerations made for the signalling above are still valid here and for the remaining part of the specification. In one example, the signalling entity is adapted to perform functions related to registration of terminals or location update. The location update may comprise a first location update—or registration upon the first connection of the terminal to a circuit switched access system—but may also comprise a periodical location update, or any similar kind of function which is aimed at checking the status of connection of the terminal, e.g. whether the terminal is still active and connected to the network or whether is has disconnected from the network due to any reason. The signalling entity, according to another example, may also comprise functions related to handover control, in those cases wherein the terminal is a mobile terminal. The signalling entity (210) may further comprise functions for managing the mobility of terminals connected through one of said circuit switched access systems (40-1 . . . 40-*n*), in those cases where the terminal is a mobile terminal and moves. In a wireless network the movement implies changing the serving cell. However, later in the description, it will be explained that the same concept may be valid also for terminals connecting over wireline networks. In general, the signalling entity is suitable for handling those signalling messages which are needed for making available circuit switched calls and services to terminals. The access call control entity (250) comprising the signalling entity (210) is arranged for handling circuit switched calls and/or services provided over circuit switched connections to the terminals (400-1 . . . 400-*n*) by means of the signalling entity (210). The access call control entity (250) comprises functions or control routines for providing services. For instance, the functions or control routines may be related to handling connections. Examples are establishing, maintaining or releasing connections, wherein the connections are managed for providing circuit switched calls or for providing services. The term calls or circuit switched calls in the present specification refers to both voice calls and to data calls. Once again, by the term service are herewith intended all kind of services that circuit switched networks may provide, including calls, text messages (such as SMS in GSM networks), fax services, call related services like call forwarding, call waiting, etc. . . . . . The interrelation between the access call control entity (250) and the signalling entity (210) is such that the access call control entity (250) is capable of handling circuit switched calls and/or services through interaction with the signalling entity (210), The signalling entity (210) manages the signalling messages necessary for providing circuit switched calls and/or services.

The access call control entity may further implement, according to a further embodiment of the invention, further types of signalling related to the provision of services or related to telephone applications like call forwarding. In other words, the interrelationship between the access call control entity (250) and the signalling entity (210) signifies that circuit switched calls and/or services managed through the access call control entity (250) are established, maintained or released according to the necessary signalling which is handled by the signalling entity (210). In other words, the signalling necessary for managing circuit switched calls and/or services is performed by the signalling entity (210).

It is to be noted that the switching server (200) of the present invention is further adapted, according to one further example, to handle also other type of services like network services. One example of network services is related to billing, to network administration or to network maintenance and operation, wherein said network services may be interrelated to the signalling necessary for providing circuit switched calls and/or services.

As already mentioned above, the signalling entity (210) exchanges circuit switched signalling messages through an access side (220). The access side (220) represents an interface of the signalling entity which exchanges circuit switched signalling messages intended for the terminals communicating via the circuit switched access systems.

The access call control entity (2050) may also comprise a network side (260) for interworking with other communication networks (50-1 . . . 50-*n*). In other words, the access side (220) of the signalling entity (210) is arranged for exchanging signalling with terminals connected through circuit switched access systems while the network side (260) of the access call control entity (250) allows the access call control entity (250) to interwork with other communication networks (50-1 . . . 50-*n*). It is noted that the network side (260) as well as the capability of interworking with other communication networks (50-1 . . . 50-*n*) can be omitted from the switching server, from the method or from the system of the present invention as it is not an essential part of the invention. In fact, it is evident and immediate that the same advantages as mentioned throughout this specification can be achieved also when the network side of the access call control entity and its capacity to interwork with other communication networks is omitted. In the present embodiment and in FIG. 3 the interworking with other communication networks is mainly represented to clearly illustrated the difference between interworking which can be done between a network (50-1 . . . 50-*n*) and the switching server (200) and the adaptation which is done between the terminal device (300) and the switching server (200). Some standard implementations of interworking between a network (50-1 . . . 50-*n*) and the switching server (200) are known in the art, as it will be explained for instance in the further embodiment related to a mobile switching centre server (MSC-S) wherein interworking between VoIP and circuit switched voice calls is handled between a network (50-1 . . . 50-*n*) and the network side of the access call control entity (250) of the switching server (200). When the network side (260) of the switching server is omitted, it is implied that interworking with different types of network is not desired.

According to a further embodiment of the switching server (200), the access side of the signalling entity (210) may be adapted for handling signalling on a user to network interface (UNI) while the network side of the access call control entity may be adapted to perform signalling on a network to network interface (NNI). Once again, the interworking on a network to network interface is not an essential part of the invention and can be omitted as also evident from the above considerations.

The interfacing entity (230) of the switching server (200) embodying the invention is for interfacing between the access side of the signalling entity and a terminal (300) connected to a switching (200) via the Internet Protocol. Multimedia Subsystem (30). The interfacing entity (230) is further arranged for interworking between circuit switched signalling messages for circuit switched connections vis-à-vis the signalling entity and signalling messages for packet switched sessions vis-à-vis the terminal (300) connected to the switching server (200) via the Internet Protocol Multimedia Subsystem (30). In other words, the interfacing entity (230) is adapted to interface between the access side (220) of the signalling entity (210) with the terminal (300) connected via the IMS (30). The interfacing entity (230) further performs the interworking, i.e.

an adaptation, between the circuit switched signalling messages handled by the switching server (200)—more specifically by means of the signalling entity (210)—and signalling messages associated instead to packet sessions, wherein the packet sessions are those established with the terminal device (300) via the IMS (30).

The switching server (200) of the present invention is therefore able to provide the same circuit switched calls and/or services, that are normally provided to terminals connected to the switching server (200) via a circuit switched access system (40-1 . . . 40-n), to the terminal device (200) connected to the switching server (200) via the IMS (30).

An advantage of the switching server of the present embodiment consists in that circuit switched calls and/or services can be directly provided to a terminal device (300) without the need to apply any modification to the core structures of the switching server, like the signalling entity (310) and the access call control entity (250). Furthermore, the switching server (200) is capable of directly delivering circuit switched calls and/or services without the need to have any additional network device which would need to do the interworking.

Furthermore, the switching server (200) according to a further embodiment of the present invention also provides the advantage of not requiring an interworking on the network level, since the interworking or adaptation of the signalling is performed directly between the switching server (200), which is a network device, and the terminal device (300), which is a user device. In a modification above illustrated, the switching server (200) achieves the advantage of performing the adaptation or interworking on a user to network interface and not on a network to network interface, resulting in an adaptation easier to implement which does not suffer from the drawbacks of low scalability and high maintenance, which would result instead from an interworking solution through an additional network device or from an interworking or adaptation done on a network to network interface.

In a further embodiment of the switching server, the access call control entity (250) is arranged for call control communication with terminals in accordance with one or more access control protocols associated with one or more of the circuit switched access systems (40-1 . . . 40-n). The circuit switched signalling messages, for which the interfacing entity (230) is arranged to interwork, conform to at least one or more of said access call control protocols. This implies that the signalling messages may form a subset of messages of the mentioned access call control protocols. This carries the advantage that it is not necessary to modify the access call control entity, as it is possible to use the already implemented protocols for signalling towards the broadband terminal (300). In particular, this solution may be alternatively implemented in the switching server (200) without the need to implement the network side of the access call control entity and/or without making reference to the access side of the signalling entity.

The access control protocols mentioned above comprise one or more among protocols like Direct Transfer Application Sub-Part Protocol, the Radio Access Network Application Part Protocol, the Base Station System Management Application Sub-Part Protocol, the ISDN User Part Protocol. However, also other protocols are suitable for implementation in the present invention, i.e. not only protocols related to GSM or ISDN, as long as they manage to provide the same or similar functionalities as the mentioned protocols in other networks as described above or as applicable to the circumstances.

In a further embodiment, the switching server exchanging the circuit switched signalling messages through the access side of the signalling entity exchange a circuit switched signalling messages like location update messages and/or mobility management messages.

In a further embodiment of the switching server, the interfacing entity is arranged to interwork between user network interface circuit switched signalling messages vis-à-vis said signalling entity and use a network interface signalling messages for packet switched sessions vis-à-vis said terminal. In other words, the switching server according to this embodiment is suitable for performing interworking or signalling adaptation by means of the interfacing entity (230) on the basis of signalling messages exchanged directly with the user. In one example, this can be performed on a user network interface (UNI). Once again, it is noted that such interface, which is simplified by the reference signs 32 in FIG. 3, is different from the interface implemented between the switching server (200) and networks (50-1 . . . 50-n), which exchange signalling messages between network elements. In one examples, these messages are exchanged on a network to network interface (NNI) which is exemplified in FIG. 3 by the reference signs 52-1 . . . 52-n. The advantage of these implementations lies in that the present invention does not rely on any additional or external network device for implementing the interworking and no loss of functionality occurs since the native set of functionality is made available to the user through the user network interface. Evidently, all the other advantages as explained in the present specification also apply to the present embodiment.

According to a further embodiment of the switching server, the interfacing is arranged for interworking between the circuit switched signalling messages for circuit switched connections and the signalling messages for packet switched sessions by means of message mapping and/or message embedding. With this respect, the same considerations apply as made with reference to the embodied method. Further details of the mapping or embedding will also be provided in the following part of the specification.

In a further embodiment of the switching server, the signalling messages for packet switched sessions conform to known protocols like the session initiation protocol, SIP, or the session initiation protocol with encapsulated ISDN user part, SIP-I. The invention is however not limited to this particular protocols, since any other known protocol which is suitable for handling signalling associated to packet switched sessions would be suitable for implementation in the present invention. The advantage consists in that reusability of existing implementation is increased. However, the invention is also not limited to known protocols since newly developed protocols or modification of the existing protocols may also be foreseen especially in those circumstances wherein the introduction of a new protocol or the modification of an existing protocol may improve certain functionalities related to the handling of packet switched sessions. Again, any kind of protocol is suitable for implementation in the present invention as long as it is suitable for handling packet switched sessions.

In a further embodiment of the switching server, the switching server comprises a mobile switching centre server (MSC-S) or a wireline telephony switching server.

Furthermore, the switching server according to another embodiment may comprise a Soft Switch.

According to a further embodiment, the switching server is suitable for implementation in a communication network comprising circuit switched access systems, wherein the circuit switched access systems comprise networks like GSM, UMTS, LTE, CDMA or thereof evolutions, etc. . . . . . In other words, the switching server may be implemented in a communication network which is comprising a wireless network serving as access network for circuit switched connections. The implementation is also not limited to wireless access networks implementing circuit switched connections, but can also be extended to wireline access networks providing circuit switched connections.

According to a further embodiment of the switching server, the network side of the access call control entity is adapted for interworking with circuit switched signalling messages for circuit switched connections and/or signalling sessions for packet switched connections of other communications networks on a network to network interface. According to this implementation, the switching server (200) is capable of interworking between circuit switched connections and packet switched sessions on a network to network interface towards other networks (50-1 . . . 50-*n*). This implies that the switching server (200) is capable of exchanging signalling messages with different networks providing services over packet switched sessions; For instance, the switching server (200) is capable of exchanging services with VoIP service providers or with network providers offering services like Skype. This interworking with different networks (50-1 . . . 50-*n*) is not an essential feature of the invention, which can evidently be omitted. However, when implemented, it provides the advantage of enhancing the interworking possibilities of the switching server also with other networks.

The access call control entity (250) of the switching server (200) may be arranged to apply predetermined control routines to circuit switched calls and/or circuit switched services controlled through one or more of the circuit switched access systems (40-1 . . . 40-2). The access call control entity (250) may be further arranged to apply the predetermined control routines to the circuit switched calls and/or circuit switched services controlled via the interfacing entity (230). In other words, the circuit switched call access control (250) is typically arranged to apply control routines through circuit switched access systems wherein the control routines relate to a wide variety of functions like handling circuit switched connection, setting up, maintaining and releasing circuit switched connections, management of terminals access through the circuit switched access systems (40-1 . . . 40-*n*) like registration of terminals, location update of terminals (first and periodic), mobility management in case the terminals are mobile terminals, etc. . . . . . According to this example, the switching server (200) is capable of apply the same predetermined control routines also to terminals (300) connected to the access call control entity (250) over the interfacing entity (230) via an IMS (30), i.e. over a broadband network based on packet switched sessions. The advantage as also illustrated above, consists in the reuse of already existing functionalities within the access call control entity (250) and signalling entity (210) also to those terminal devices, like the terminal device (300), which access the switching server over a packet switched access network.

According to one embodiment of the switching server, the access call control entity is arranged for handling packet switched voice communications via the interfacing entity (230). An example of a packet switched voice communication is VoIP. However, the invention is not restricted to VoIP since other protocols are possible as long as they are suitable for transporting voice in packets.

The services or circuit switched services provided by or through the switching server (200) comprise a wide variety of services such as text message service. An example of a text message service is SMS in a GSM network. However, the invention is not restricted to SMS services but is suitable for delivering any type of text messaging service as long as said services are able to provide a text to a user. Other examples are E-mail, Facsimile converted in text messages, etc. . . . . .

Figure 4:
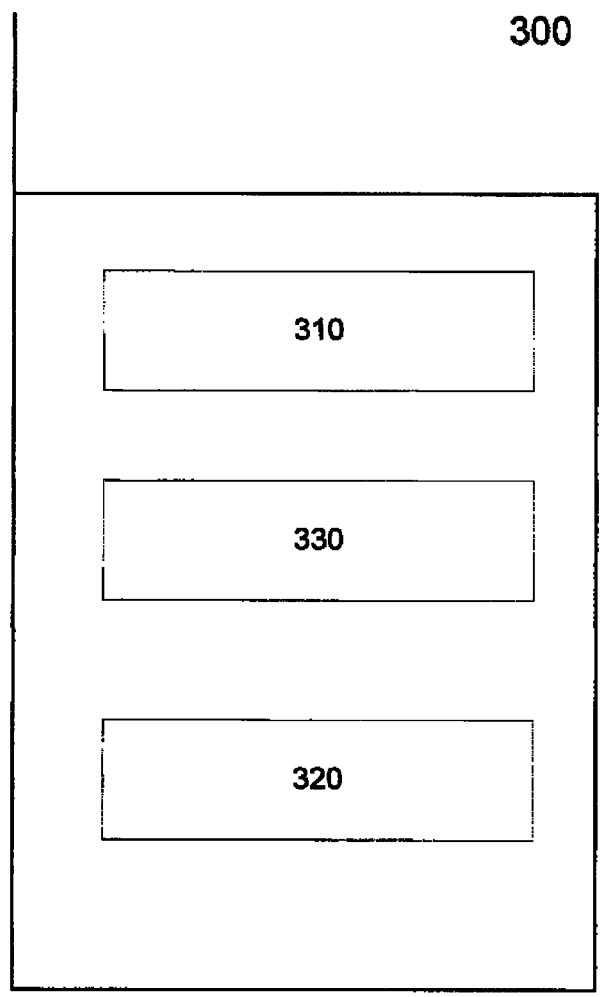
FIG. 4 illustrates a block functional diagram of a communication device according to an embodiment of the present invention.

Reference will now be made to FIG. 4, illustrating a communication device (300) for providing services to a user a further embodiment of the present invention. The same considerations made above are valid also for the device of FIG. 4. For instance, the services can be of any kind as indicated with reference to the method or switching server embodying the invention. The communication device (300) is adapted to access a switching server (200) via an Internet Protocol Multimedia Subsystem (30) and comprises a service providing unit (310), a session terminating unit (320) and an interworking unit (330).

The service providing unit (310) makes circuit switched telephone services available to a user by means of circuit switched signalling messages related to circuit switched connections. In other words, the service providing unit (310) implements suitable functions in a communication device (300) such that the user of the communication device (300) can make use of those services typical of circuit switched connection networks and which are typically handled by means of circuit switched signalling messages.

The session terminating unit (320) is adapted to terminate signalling messages related to packet switched sessions.

The interworking unit (330) is adapted to interwork between circuit switched signalling messages related to circuit switched messages towards the service providing unit (310) and signalling messages related to packet switched sessions towards the sessions terminating unit (320). In other words, the interworking unity (330) can be considered as a unit adapted to interwork between the circuit switched messages handled by the service providing unity (310) and the signalling messages related to packet switched sessions which are instead handled by the section terminating unit (320).

Examples of the terminal device (300) can be a personal computer, a laptop, a PDA, a set-top box, an ADSL router or any device which can be connected to the Internet through an access connection like an ADSL connection. The ADSL connection would represent the means to access the switching server (200) through the IMS network (30). Other devices can be used as long as they are capable of connecting through the ADSL or through other access technologies, i.e. wireline or wireless access network are all a possibility for accessing the switching server (200) over the IMS (30).

The terminal device (300) provides the advantage of making available to the user the same services as if the user would be connected through a circuit switched access system. In other words, the circuit switched call or service is provided transparently to the user without the user experiencing any difference due to the presence of IMS. This increases the reliability and look and feel of the user applications.

Furthermore, the development of the application on the terminal (300) providing the circuit switched calls or services is made easier. In fact, the same core software or application routines used for the terminals (400-1 . . . 400-*n*) can be re-used for the terminal (300).

Other advantages as listed in the description also apply to the terminal device of the present invention.

Figure 5:
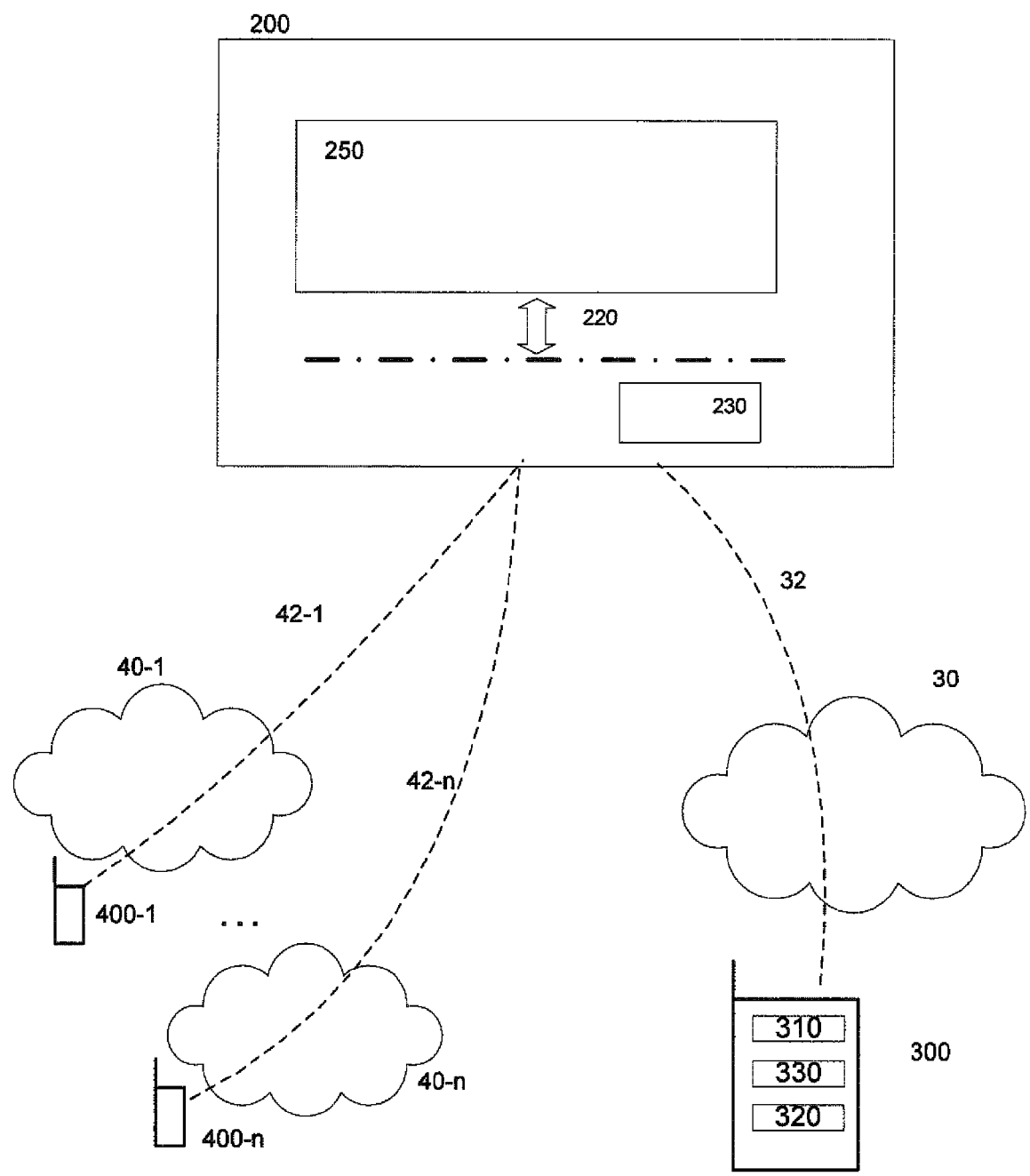
FIG. 5 illustrates a functional diagram of a system for providing services in a communication network according to an embodiment of the present invention.

Reference will now be made to FIG. 5 illustrating a system for providing services in a communication network, according to another embodiment of the present invention. The communication network (10) depicted in this figure comprises an Internet Protocol Multimedia Subsystem (30) and one or more circuit switched access systems (40-1 . . . 40-*n*).

The system comprises a switching server (200) and a terminal device (300). The switching server (200) and the terminal device (300) may comprise those respectively depicted in FIGS. 3 and 4 and above described. However, not all of their functionalities are needed as explained in the following.

The switching server (200) includes an access call control entity (250) arranged for handling one or both of circuit switched calls and services provided over circuit switched connections by means of circuit switched signalling messages to terminals (400-1 ... 400-*n*) connected to the switching server (200) via one or more of the circuit switched access systems (40-1 ... 40-*n*). In other words, the switching server (200) is able to provide through the access call control entity (250) circuit switched calls or services to terminals (300) connected to the switching server (200) via a circuit switched access system (400-1 ... 400-*n*).

The terminal (300) included in the system is connected to the switching server (200) via the Internet Protocol Multimedia Subsystem (30). The communication network is further adapted to provide one or both of the circuit switched calls and services to the terminal device (300). In other words, the communication network is suitable for providing circuit switched calls or services to terminals (400-1 ... 400-*n*) connected to the switching server (200) via a circuit switched access systems and at the same time is suitable for providing circuit switched calls or services to a terminal device (300) connected to the switching server (200) through an Internet Protocol Multimedia Subsystem (30), therefore to terminal devices which can be connected over packet switched access networks.

The terminal device (300) of the system further comprises a service providing entity (310) for making available to a user one or both of the circuit switched calls and services by means of the circuit switched signalling messages related to circuit switched connections; and a first interworking entity (330) for interworking between the circuit switched signalling messages towards the access call control entity and signalling messages related to packet switched sessions towards the Internet Protocol Multimedia Subsystem. In other words, the terminal device comprises suitable functions for making available to a user circuit switched calls or services; the first interworking entity (330) is for interfacing the circuit switched signalling messages, associated to the circuit switched calls or services, with the signalling messages related to packet switched sessions, which are associated with packet switched session within the Internet Protocol Multimedia Subsystem.

The switching server (200) of the system further comprises a second interworking entity (230) between the Internet Protocol Multimedia Subsystem (30) and the access call control entity (250), wherein the second interworking entity (230) is arranged for interworking between signalling messages related to packet switched sessions towards the Internet Protocol Multimedia Subsystem (30) and circuit switched signalling messages towards the access call control entity (250), inversely to the first interworking entity. In other words, the switching server comprises a second interworking entity which performs the interworking which is inversed to the interworking performed by the first interworking entity of the terminal device.

In the system embodying the invention, the terminal device (300) and the switching server (200) comprise respective controller entities for establishing a packet switched session terminated by the first and second interworking entities, and for providing one or both of a circuit switched call and service from the access call control entity arranged for circuit switched connections to the service providing entity in the terminal device via the first and second interworking entities. In other words, the terminal device and the switching server are adapted to establish a packet switched session between themselves by means of the first and second interworking entities and are arranged such that circuit switched call and services are directly provided from the switching server to the terminal device through the first and second interworking entities.

The system of the present invention achieved the advantages as described in the specification.

Figure 6:
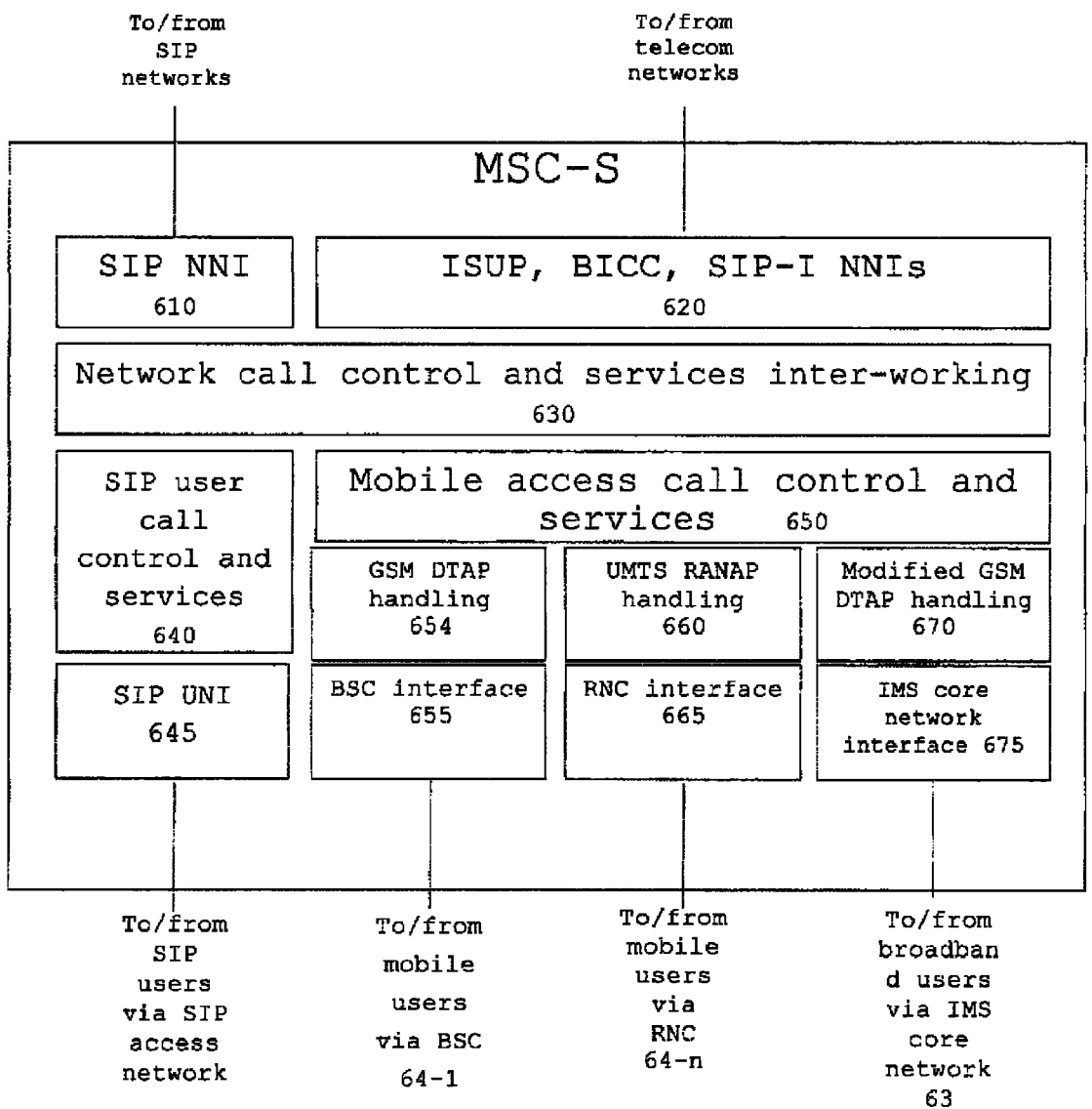
FIG. 6 illustrates a block functional diagram of an MSC-S according to an embodiment of the present invention.

Reference will now be made to FIG. 6, illustrating an embodiment of the invention wherein the switching server (200) comprises a mobile Soft Switch (MSC-S).

The mobile soft switch (MSC-S) is enhanced with the functionality to terminate an IP MM SIP and SIP-I connection. As a result the mobile soft switch can connect to the IMS core network without additional gateways or application servers required to handle the interwork.

The mobile soft switch (MSC-S) is further enhanced to handle a narrow band mobile terminal signalling access through the IP MM SIP and SIP-I connection.

As it can be seen in FIG. 6, the MSC-S comprises the entity 630 for performing call control and services interworking. This entity comprises carrying out adaptation of functions on a network level. This entity can be implemented in hardware, software or any combination thereof and can be comprised in one unit or distributed over several units. This consideration is valid for all entities disclosed in the present specification and not only with reference to this example.

The MSC-S further comprises entity 620 handling protocols like ISUP, BICC, SIP-I NNIs. This entity comprises functions for the management and adaptation of a series of protocols, like ISUP, BICC, STP-I on a network to network interface (NNI). This entity may comprise, for instance, adaptation of SIP signalling towards/from other networks. In one example, this entity may comprise adaptation according to the 3GPP 29.163 standard. Furthermore, this entity may comprise in a further embodiment of the invention part or all of the functionalities which are currently implemented in an external additional interworking node.

The entity 610 (SIP NNI) is for carrying out specific adaptation with SIP network to network protocols. In one example, this entity performs adaptation to SIP service providers.

The entity 645 denotes an entity for carrying out adaptation and communication with SIP users on a user network interface (UNI). The entity 640 (SIP user call control and services) indicates an entity for adapting the SIP UNI signalling such that it can interacts with the entity 630, which in turn manages interworking of functions related to call control and services, wherein the adaptation or interworking is done among different networks. It is noted that the entities 640 or 610 are not capable of providing directly circuit switched calls or services, but that emulation and/or an adaptation through the entity 630 is needed. Such a solution is not able to provide the advantages of the invention, as same reliability, same look and feel as native circuit switched call and services, etc. . . . . .

The entities 610, 620 and 630 or part thereof are in one example entities communicating with the network access side 260 of the switching server 200 of FIG. 3. In another example, entities 610, 620 and 630 may be part of the network access side 260 of the switching server 200 of FIG. 3.

The entity 650 is for providing mobile access call control and services. In one example, the entity 650 is comprised in the access call control entity 250 of the switching server 200 of FIG. 3. The entity 650 comprises functionalities related for instance to call waiting, handling services such as SMS, handling mobility management, location update (first and periodic, etc. . . . . .

The entity 654 is for handling protocols like the GSM DTAP and is interfaced on one side with the mobile access call control and services entity 650 and on the other side with the entity 655 which is an interface for communicating with a BSC. Entities 654 and 655 are thus entities adapted for allowing communication between the mobile access call control and services entity 650 and a GSM access network. The GSM access network is comprised in one example in one of the circuit switched access systems 40-1 . . . 40-*n* of FIG. 1, 3 or 5. The entities 654 and 655 are therefore the entities responsible in the MSC-S for allowing access to the entity 650 from a GSM access network.

Similarly, entities 660 and 665 are adapted for allowing access to a the mobile access call control and services entity 650 from a UMTS access network. The UMTS access network represents in one example one of the access systems 40-1 . . . 40-*n* of FIG. 1, 3 or 5. More in details, entity 660 is for handling protocols like UMTS RANAP. Entity 665 is for interfacing to an RNC.

The group of entities 654, 655 on one side and entities 660, 665 on the other side are group of entities for allowing access from the mobile access call control and services entity 650 to an access system. In one example, these groups of entities are comprised in the switching server 200 of the invention for allowing access to one or more of the access systems 40-1 . . . 40-*n*, according to an example.

The entity 670, as explained above, is adapted for handling GSM DTAP protocol or a modified GSM DTAP protocol. Entity 675 is for interfacing to the IMS core network. The entities 670 and 675 are responsible in one embodiment for decapsulating the DTAP messages which have been embedded in SIP messages or tunnelled in SIP messages. In another embodiment these entities are responsible for mapping and demapping DTAP messages and SIP messages. In another embodiments, they perform a combination of decapsulation/encapsulation and mapping/demapping. In other words, the entities 670 and 675 are responsible for adapting native signalling of the mobile access call control and services entity 650 and native signalling exchanged with the IMS network though the IMS core network interface 675. In one example, the entities 670 and 675—or a suitable combination of parts thereof—may be comprised in the interfacing entity 230 of the switching server 200 embodying the invention.

With reference 64-1 is indicated the connection to users via the BSC. In one example, the connection 64-1 may be comprised in one of the connections 42-1 . . . 42-*n* as described with reference to one of FIG. 1, 3 or 5. Similarly, the connection 64-2 is comprised in one example in one of the connections 42-1 . . . 42-*n* as described with reference to one of FIG. 1, 3 or 5. The connection referenced with 63 schematically represents a connection from the MSC-S to a terminal connected over the IMS. In one example, the connection 63 is comprised in a connection 32 from the switching server 200 to the terminal 300 via the IMS 30 as described with reference to one of FIG. 1, 3 or 5. In a further example, the user may be connected to the interface entity 675 by accessing a network through an ADSL connection, or ePON, just to name a few examples of providing access over an IMS.

One of the advantages of this embodiment consists in that the mobile access call control and services entity 650 is capable of providing to any type of terminal or client the same kind of services or calls. Particularly, it is capable of providing to a terminal or client, connected through the IMS, the same circuit switched calls and services as it would normally provide to GSM or UMTS terminals and users thereof. Obviously, all the other advantages of the invention apply also to the present embodiment.

For the rest of the MSC-S, an access through the IMS core network interface is handled in the same way as any other mobile terminal access. Since the call control and service logic is common for the GSM, UMTS and DTAP/BSSMAP based IP MM accesses, full service interwork takes place, regardless of access.

With reference to the MSC-S of FIG. 6, the following shall be noted. Independent of this invention, SIP UNI, SIP call control and services and SIP NNI interfaces may be present in the MSC-S as separate logic. This logic allows SIP users to receive native SIP services from the MSC-S. Through further logic, the MSC-S may also provide inter-work between SIP users and other services located in the MSC-S. These functions or parts thereof may be comprised for instance in the entities 610, 640, 645. However, it is remarked that these parts or entities are not part of the invention and can be omitted.

Figure 7:
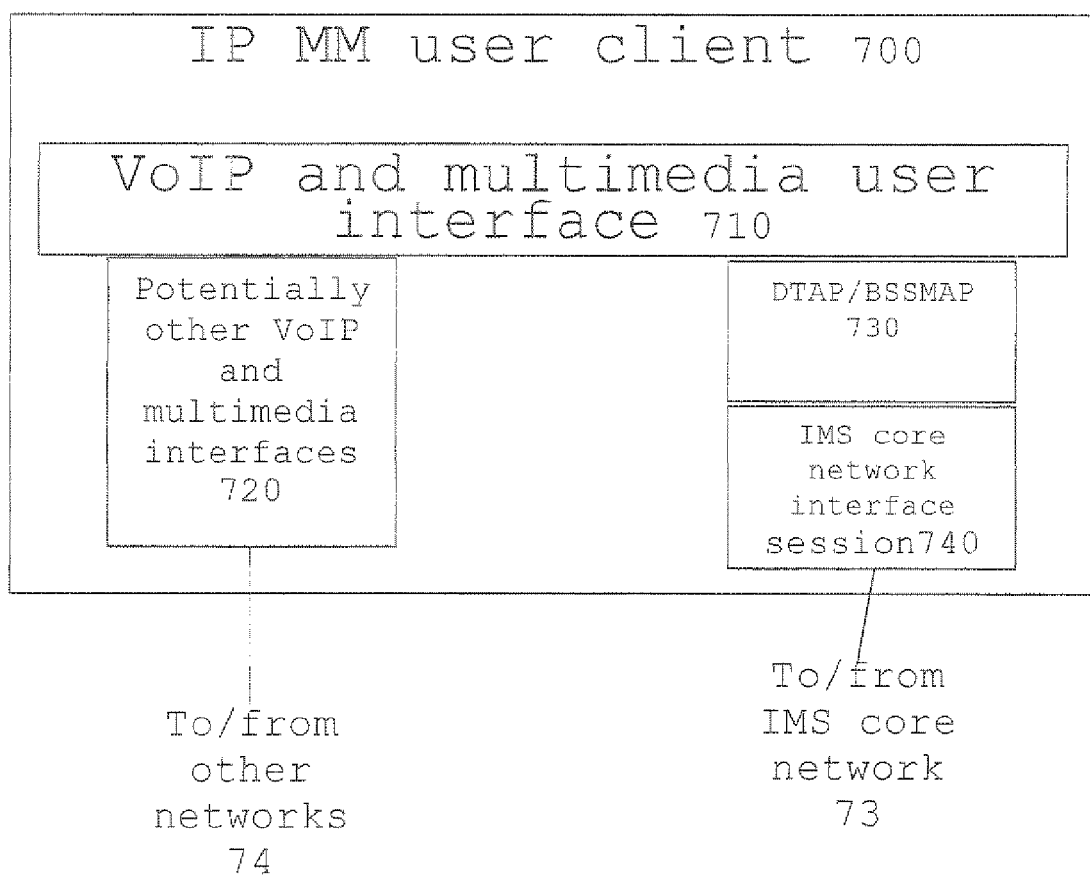
FIG. 7 is a block functional diagram of an IP MM user client according to an embodiment of the present invention.

Reference will now be made to FIG. 7, illustrating an example of an IP MM user client (700). According to this example, a broad band client (700), with IP MM session support, is capable to emulate or behave like a mobile terminal and use the mobile soft switch voice and other services, like SMS. The emulation is made on top of and transparent to an IP MM SIP and SIP-I connection. It should be noted that emulation is not strictly necessary. In fact, the broad band client may implement the entire set or a subset of the application routines that a mobile terminal (like a GSM phone) is typically implementing for making calls and services available to a user. In such a way, the user has the same look and feel as a GSM user, and the development of software and/or hardware is simplified.

The user client 700 comprises a VoIP and multimedia interface 710 which is adapted to provide to the user an interface for providing services like VoIP.

The user client 700 further provides an entity 720 for interfacing to other networks for exchanging VoIP communications or multimedia communications.

The entity 740 is adapted instead to interface with the IMS core network through sessions according to packet switched communication. In one example, the entity 740 is comprised in the session terminating unit 320 of the terminal device 300 described with reference to the embodiment depicted in FIG. 4.

The entity 730 is adapted to handle protocols like DTAP or BSSMAP or a subset of these protocols. In one example, this entity comprises all the routines or functionalities typically implemented in a GSM or UMTS terminal. In one example, entity 730 comprises an application programming interface which is the same implemented on a GSM or UMTS terminal. In one example, the DTAP and BSSMAP messages are mapped or demapped to/from SIP messages. In another example, DTAP and BSSMAP messages are embedded, encapsulated or tunnelled in SIP messages. Essentially, in this example the entity 730 performs the inverse of the operation performed by the interfacing entities 670 and 675. In one example, the entity 730 is comprised in the interworking unit 330.

In another example, the entities 730 and 740—or suitable parts thereof—are comprised or distributed among the session terminating unit 320 and interworking unit 330 described with reference to the terminal device embodying the invention and depicted in FIG. 1, 3, 4 or 5. In other words, the embedding or mapping part does not need necessarily be comprised in the entity 730 but may be distributed conveniently in the entities 730 and 730, as long as they perform the inverse operation of the entities 670 and 675 of the MSC-S depicted in FIG. 6.

This embodiment enhances an IP MM user client at the broad band access to emulate or behave like the other end of the DTAP/BSSMAP subset as shown in FIG. 7. As an alternative to implementing a DTAP/BSSMAP subsystem, the IP MM user client could be enhanced to implement a RAMAP subset.

The advantage of the use client consists in that the same routines and functionalities of a standard GSM or UMTS terminal can be reused in the user client. Consequently, the user of the client 700 will experience the same look and feel and the same functionalities as a user of typical GSM or UMTS calls and services. Obviously, the other advantages of the invention also apply to the user client 700.

The IMS core network is used to provide access integrity (client authentication, security, etc) and as a decision point whether the mobile soft switch service shall be invoked or not For this purpose no functional enhancement to the IMS core network is needed, nor is application server support required. This provides a further advantage of the invention.

All aspects of the mobile voice service and related services are handled by the mobile soft switch (MSC-S), reusing existing implementation in the mobile soft switch.

Reference will now be made to a further embodiment wherein the switching server comprises a mobile switching centre server (MSC-S) part. The MSC-S part is comprised in a mobile Soft Switch. According to this embodiment, two enhancements to the MSC-S are provided:
- an IMS core network interface operating in parallel to the BSC and RNC interfaces and in a similar fashion;
- a modified mobile phone interface able to send and receive messages from the above mentioned IMS core network interface. The modified mobile phone interface implements a subset of GSM DTAP/BSSMAP and supports call control and other circuit switched services. As an alternative to having a subset of DTAP/BSSMAP; a subset of RANAP can be used.

According to this embodiment, a soft switch is provided comprising an MSC-S part as described with reference to FIG. 6.

Figure 8:
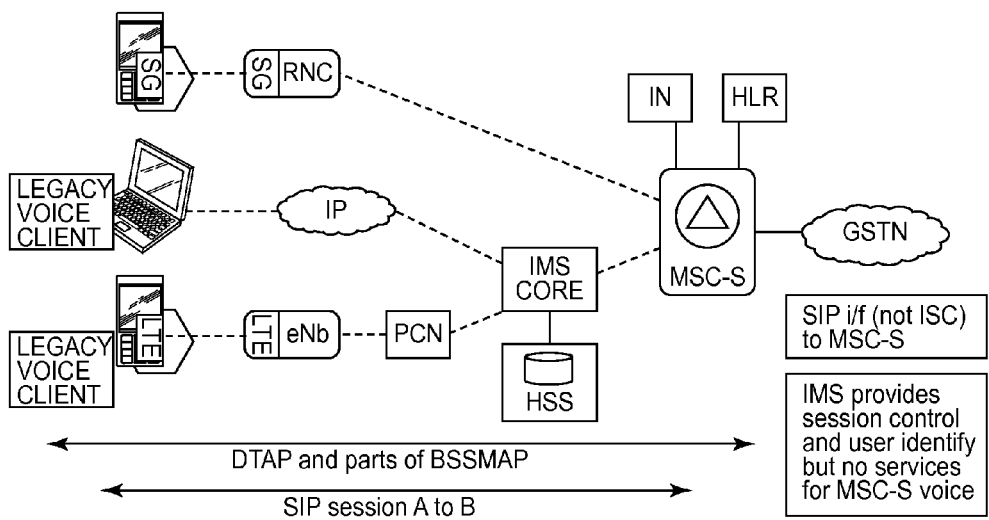
FIG. 8 represents a block functional diagram illustrating an MSC-S based VoIP according to an embodiment of the present invention.

The embodiments of the invention further rely on the availability of a standard IMS core network for the purpose to secure the integrity of the broad access as well as handling the SIP sessions as shown in FIG. 8. The network illustrated in FIG. 8 is an example of the general network depicted in FIG. 1. The terminal devices on the left hand side of FIG. 8 (namely, the upper 3G terminal, the laptop in the middle left side, the LTE terminal in the left hand side bottom) are examples of terminals depicted in FIG. 1. The MSC-S of FIG. 8 may be comprised in the switching server (200) of FIG. 1. The IMS of FIG. 8 provides session control and user identification but typically no services for MSC-S voice. A SIP interface (not ISC) is typically needed to interwork with the MSC-S from another network, e.g. from the GSTN illustrated in FIG. 8.

The embodiments of the invention can also be implemented by the means of a telephony soft switch (TSS). In this case and if wanted in order to preserve wireline market services, the IP MM user client and the enhancement to the TSS could implement a wireline DSS1 subset, rather than implementing a DTAP/ESSMAP subset. This makes it possible for the IP MM user client to access the same DSS1 services, including market adaptations, as any other DSS1 subscriber.

In the following, the realization of the operations to implement the mobile service on a broad band access using DTAP/BSSMAP is described.

Through configuration data, the IMS core network is instructed to allow SIP and SIP-I signaling between a user client and the MSC-S.

At start of MSC-S, or as a result of operation and maintenance procedures, the MSC-S makes itself known to the IMS core network by performing authentication and registration according to standard IP MM procedures.

As a result the MSC-S becomes visible to the IMS core network, and the IMS core network can route SIP and SIP-I messages to and from the MSC-S.

Messages between the IP MM user client and the IMS core network, and between the IMS core network and the MSC-S are sent as SIP and/or SIP-I messages. The DTAP/BSSMAP messages between the IP MM user client and the MSC-S are hereby embedded in SIP-I messages according to table 1 below. It is noted that this is an example of the interworking made by the first interworking entity (330) of the terminal device (300) and by the second interworking entity (230) of the switching server (200), according to the embodiments of the present invention. The mapping below may be further implemented in the entities of the MSC-S of FIG. 6 and on the user client 700 of FIG. 7.

TABLE

| MESSAGE MAPPING | | |
| --- | --- | --- |
| ISUP | BSSMAP/DTAP | SIP-I |
| IAM | SETUP | INVITE (IAM) |
| ACM | Alert | 183 Session Progress (ACM) |
| ANM | Connect | 200 ok (ANM) |
| REL | Disconnect | BYE (REL) |
| RLC | Release Complete | 200 ok (RLC) |
|  | Other messages | INFO (other messages) |

Figure 9:
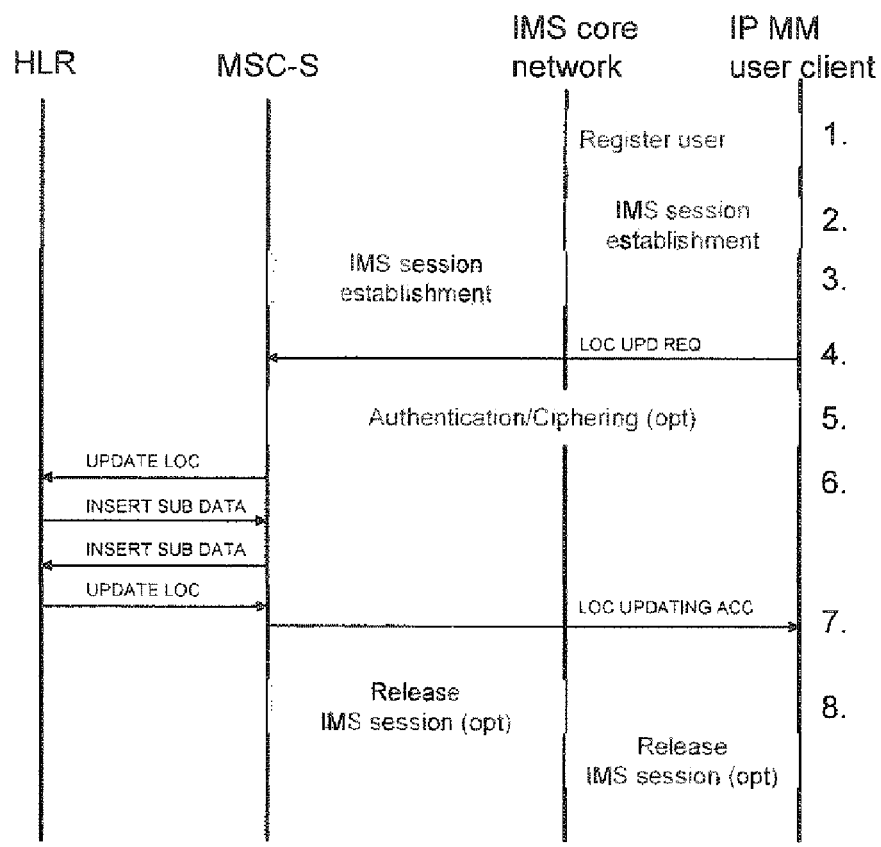
FIG. 9 illustrates a new location update signalling flow according to an embodiment of the present invention.

FIG. 9 represents the phases related to the IS MM user client registration as mobile terminal. When a user wants to be reachable on a mobile network from the broad band access (see also FIG. 9):
1. The user activates the IP MM user client, and through standard IP MM procedures, the user is first authenticated and registered in the IMS core network.
2. The TP MM client then requests the IMS core network to set-up a SIP session using the address of the MSC-S and indicating the circuit switched number that the user shall be identified with.
3. The IMS core network validates the request using standard IP MM procedures and routing data maintained in the IMS core network. Based on the validation result the IMS core network either allows the requests and establishes a SIP connection to a MSC-S, or rejects the request.
4. Upon reception of an incoming SIP connection request from the IMS core network, the MSC-S proceeds to invoke the location updating procedure for a mobile subscriber.
5. In the case the MSC-S does not want to rely on the authentication and integrity protection made by the IMS core network, the MSC-S may as an option perform authentication of and invoke ciphering to the IP MM user client.
6. The MSC-S queries the HLR for subscriber data and asks for permission to register this subscriber. In case the HLR does not allow registration, the MSC-S rejects the location update request.
7. Upon successful response from the HLR, the MSC-S registers the subscriber, thereby indicating that the subscriber is reachable in the circuit switched core network, and sends back a location updating success message to the IP MM client.
8. In the case the MSC-S does not want to maintain the SIP session, the MSC-S initiates a release of the SIP session towards the IMS core network, which proceeds to release the SIP session towards the TP MM user client.

It is easily recognised that a user client is treated by the MSC-S as a normal standard GSM terminal.

Figure 10:
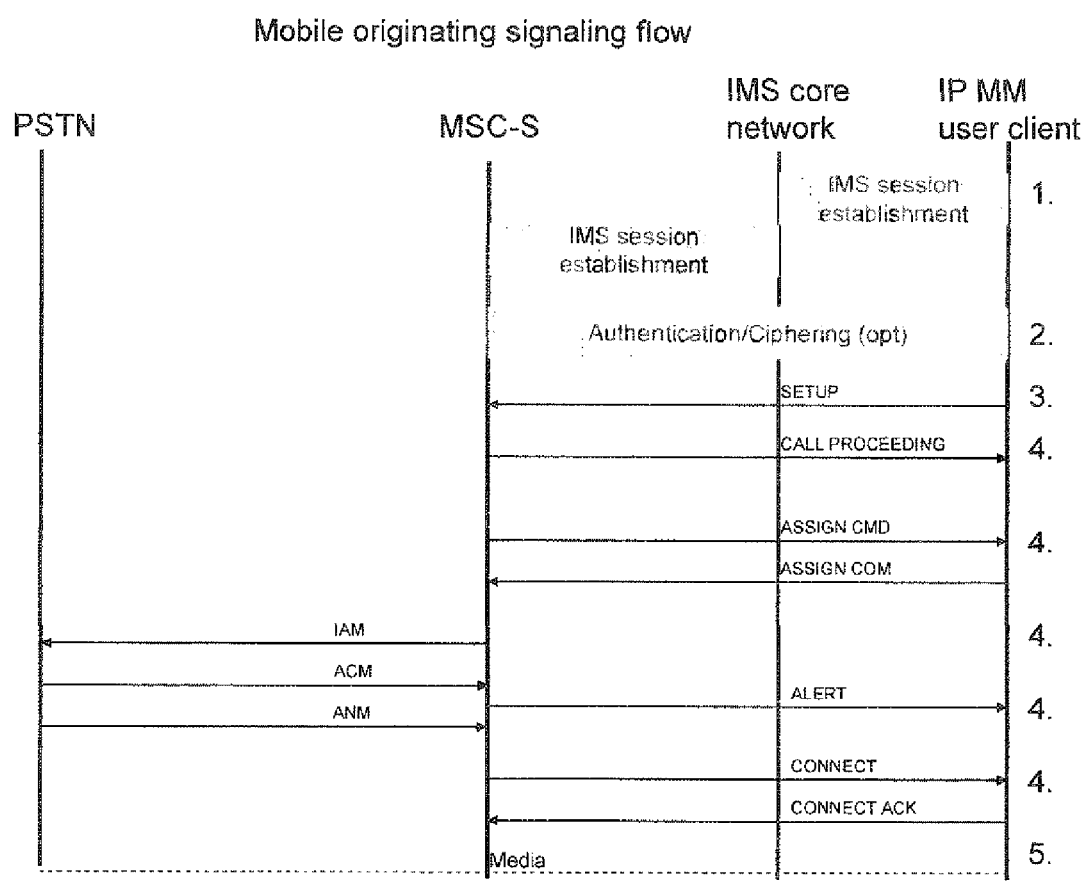
FIG. 10 illustrates a mobile originating signalling flow according to an embodiment of the present invention.

FIG. 10 depicts the phases related to the IP MM user client mobile originating call. When the user wants to originate a call, the following operations take place:
1. In case a SIP session through the IMS core network to the MSC-S is already established, for example at location updating, this SIP session is used. Otherwise the IP MM user client establishes a new SIP session with the IMS core network directed towards the MSC-S.
2. In the case the MSC-S does not want to rely on the authentication and integrity protection made by the IMS core network, the MSC-S may as an option perform authentication of and invoke ciphering to the IP MM user client.
3. The IP MM user client issues a Call Setup DTAP message, which is sent towards the IMS core network as a SIP-I INVITE/TAM message and forwarded to the MSC-S.
4. The MSC-S receives the Call Setup message and validates this. Upon successful validation the Call Setup request is accepted and signaling towards the network and access sides are done to complete the call set-up towards the network. DTAP/BSSMAP messages are hereby either mapped to a SIP-I equivalent message or sent as SIP-I INFO messages according to table.
5. Upon through connection, a media path is ordered from the Maw and the user client.
6. Call charging and interactions during the call are handled as for other mobile originating calls in the MSC-S.
7. At end of call, the media path is released and the IP MM user client is informed that the call is terminated.

Figure 11A:
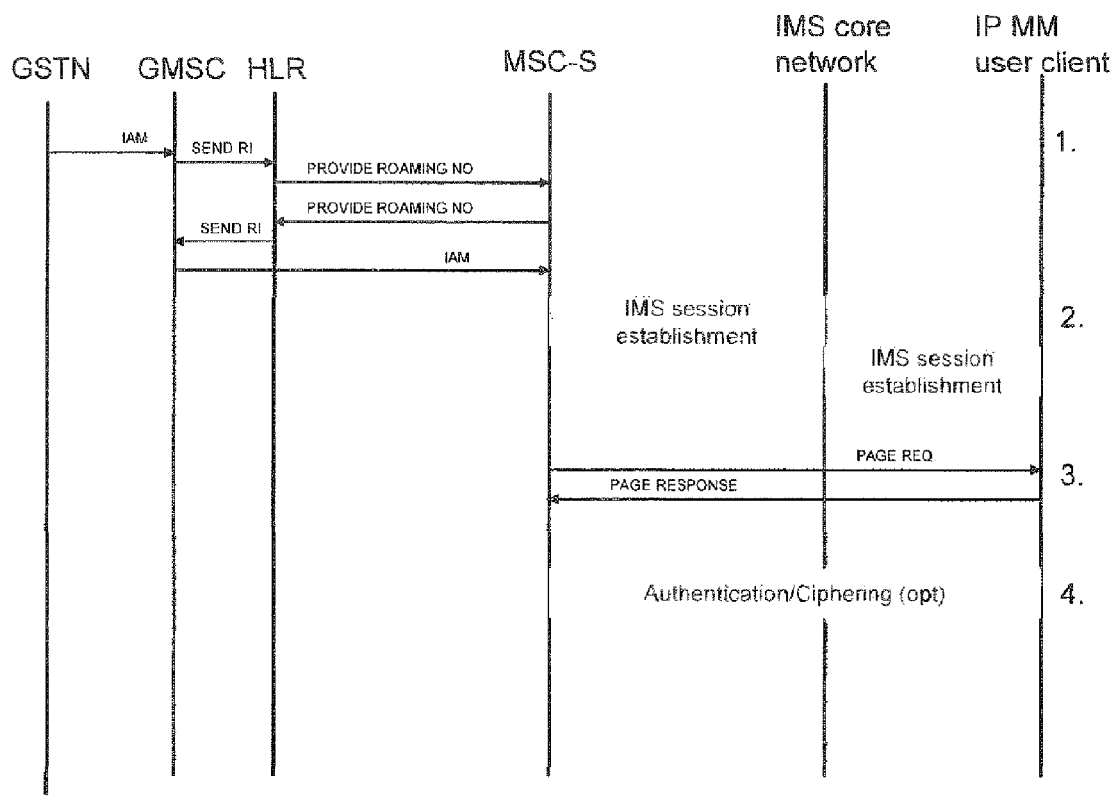
FIG. 11A illustrates a new mobile terminating signalling flow, part 1 of 2, according to an embodiment of the present.
Figure 11B:
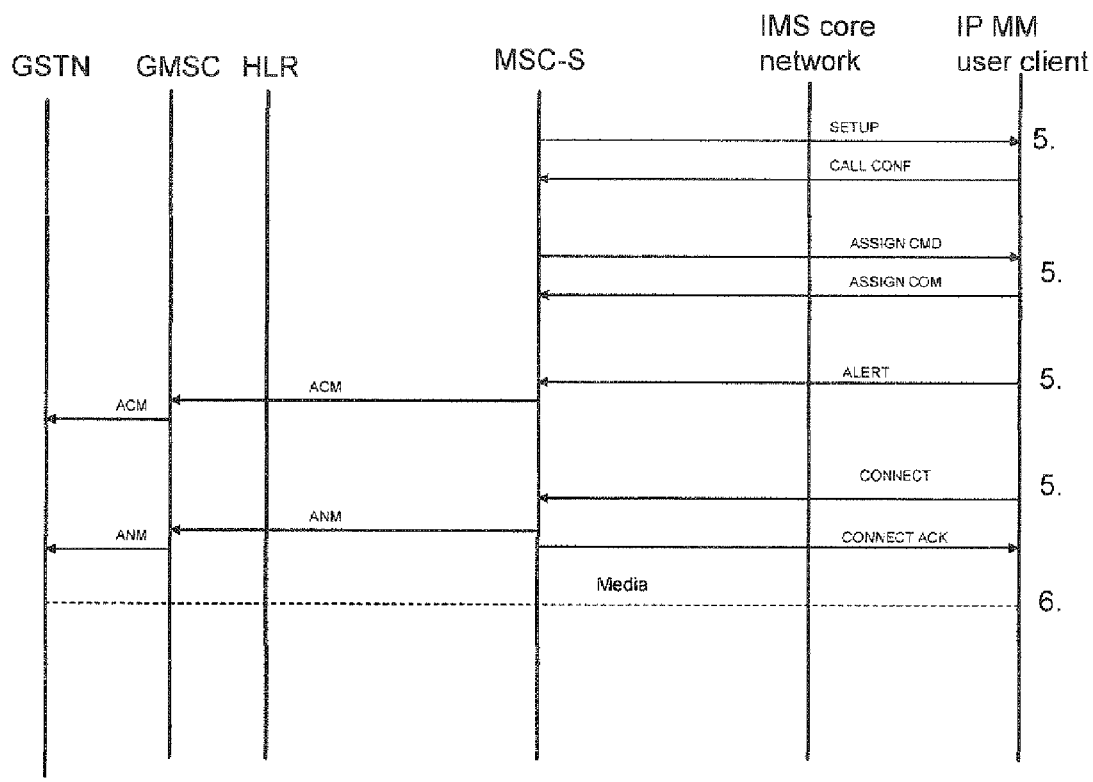
FIG. 11B represents the new mobile terminating signalling flow, part 2 of 2, according to an embodiment of the present invention.

FIGS. 11A and 11B related to IP MM user client mobile terminated call. When a call directed to an IP MM user client registered at a MSC-S comes in, the following operations take place:
1. When the MSC-S receives a request for routing information for an IP MM user client registered in the MSC-S, it provides a roaming number to the network. The network hereby routes the call to the MSC-S.
2. When the MSC-S receives the call from the network side with the address of the IP MM user client, it investigates if a SIP session exists that allows the MSC-S to reach the IP MM user client. If this is not the case, the MSC-S requests the IMS core network to establish a SIP session towards the IP MM user client, using the tel-URI for the IP MM user client.
3. The MSC-S then sends a paging request to the IP MM user client within the existing SIP session. In the case the IP MM user client does not respond or responds negatively to the paging request, the MSC-S may invoke supplementary services for not responding mobile subscribers as defined by exchange data in the MSC-S. In the case the IP MM user client acknowledges by sending back a page response, the call set-up continues.
4. In the case the MSC-S does not want to rely on the authentication and integrity protection made by the IMS core network, the MSC-S may as an option perform authentication of and invoke ciphering to the IP MM user client.
5. The MSC-S issues a Call Setup DTAP message, which is sent towards the IMS core network as a SIP-I INVITE/IAM message and forwarded to the IP MM user client. If the IP MM user client accepts the Call Setup request, the MSC-S performs required signaling to the network and the user client to establish the call. DTAP/BSSMAP messages are hereby either mapped to a SIP-1 equivalent message or sent as SIP-I INFO messages according to table. In the case the user client does not accept the call, the same procedures as for other mobile subscribers take place, I e invocation of supplementary services etc.
6. Upon through connection, a media path is ordered from the MGw and the user client.
7. Call charging and interactions during the call are handled as for other mobile terminating calls in the MSC-S.
8. At end of call, the media path is released and the IP MM user client is informed that the call is terminated.

The invention can also be applied to the case of IP MM user client mobile terminal de-registration. The IP MM user client deregisters from the MSC-S in a number of cases:

After long inactivity the MSC-S orders the IMS core network to close any open SIP sessions and deregisters the mobile subscriber from the MSC-S.

When the MSC-S receives a request from the IMS core network to close the SIP session, or receives an explicit detach request from the IP MM user client, the MSC-S will close the SIP session and deregister the mobile subscriber.

When the MSC-S receives a deregistration request from the network, the MSC-S will order the IMS core network to close the SIP session and deregisters the mobile subscriber.

Additional operations are also foreseen. Given support in the user client, all other services available for mobile subscribers, like originating and terminating SMS, USSD, supplementary service procedures etc, are also available for mobile subscribers connecting on broad band accesses.

The present invention, as already mentioned in other parts of this specification, may be applied to a wide variety of access networks, including wireless and wireline access network. POTS and ISDN accesses networks are examples of wireline access networks. When POTS or ISDN access networks are implemented, some adaptations may need to be made. For instance, functions like mobility management may preferably be adapted as illustrated in the following. According to an embodiment, mobility management for POTS and ISDN accesses may be based on the identification provided by the user equipment to the IMS core network, validated by the IMS core network and forwarded to the soft switch. In one illustrating example, the functions may be implemented by the following steps:
1. The user equipment indicates that it handles the international number 4924012345678 (an exemplary telephone number).
2. The IMS core network validates that the user equipment is allowed to use this number (according to existing functions in the IMS core network).
3. When setting up the connection to the soft switch, the IMS core network indicates that the softswitch shall receive from and route calls towards this number for this user equipment.
4. For the access logic related to POTS and ISDN accesses in the wireline soft switch, this triggers the wireline soft switch to register a wireline subscriber with number 4924012345678 (the exemplary telephone number indicated above) and to receive and originate calls from this subscriber.

Other modifications of the above routines may however be possible as long as they allow the management of the mobility of users accessing from a wireline network.

The switching server according to the invention and other switching server services and hardware, e.g. the reuse of Soft Switch voice and other Mobile Soft Switch services and hardware, brings numerous advantages according to the several embodiments of the invention as evident from the following:

The availability, scalability and fulfillment of market and regulatory requirements are at the same level as mobile telephony;

The hardware used to deliver the voice service is at very competitive price levels;

Balancing capacity and investments between broad band and radio accesses is done transparently within the mobile soft switch, since the same equipment is used for both types of accesses;

The service providers' existing voice business models, including prepaid, are reused and expanded to cover also broad band accesses;

From an operations perspective, the service provider's staff does not need to learn to handle new types of voice systems;

The amount of node types to maintain in the voice network is not increased (assuming the operator anyhow has an IP MM system) which lowers site requirements on foot print, cabling, cooling etc. . . . ;

No additional software update or upgrade activities are needed for the broadband voice connections;

The independence of the type broad band access, meaning that it can provide circuit switched voice services also over future mobile broad band standards like LTE, where today no circuit service is defined;

It allows an operator that wants to invest in IP MM and MMtel to gradually migrate subscribers in a seamless fashion by modifying subscriber data in the IP MM network. For example: A broadband user might originally access the mobile soft switch through the user client and later through an entry in the HSS instead of being directed to the MMtel service;

It provides an option for FMC for broad band and mobile subscribers since both broad band and mobile subscribers can receive the same mobile soft switch service;

It is simple to implement in the sense the IP MM is used for user authentication and connection control, and all voice services are provided by the mobile Soft Switch. There is no requirement on service logic, application servers or gateway inter-work between IP MM and the circuit domain;

It allows the operator, if desired, to implement interactions between the IP MM and voice domain as part of the SIP session control and/or the user client;

It stimulates the dynamics in the markets and allows for a multitude of user client implementations (no claims for the user client).

The above advantages apply also to the method, the switching server, the system, the terminal device and the several embodiments according to the present invention.

Furthermore, the invention provides a VoIP solution for broadband access based on standardized architectures, like the IP MM (IP Multi Media), IMS and the GSM/3GPPP architectures.

It will be apparent to those skilled in the art that various modifications and variations can be made in the entities and methods of the invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A method implemented by a terminal device connected to a switching server via an Internet Protocol Multimedia Subsystem (IMS) for being provided one or both of circuit-switched calls and services over a packet-switched session, wherein the switching server comprises an access call control entity configured to handle circuit-switched signaling messages for providing one or both of circuit-switched calls and services over circuit-switched connections to terminal devices connected to the switching server via one or more circuit-switched access systems, the method comprising:

using circuit-switched signaling messages at a service-providing entity of the terminal device for one or both of said circuit-switched calls and services, wherein the circuit-switched signaling messages conform to a protocol for being provided said calls and services over a circuit-switched connection towards said access call control entity;

interworking, at a first interworking entity comprised within the terminal device, between said circuit-switched signaling messages and signaling messages that conform to a protocol for packet-switched sessions via the IMS, inversely to a second interworking entity at the switching center;

establishing a packet-switched session between the first interworking entity at the terminal device and the second interworking entity at the switching server;

exchanging circuit-switched signaling messages between the terminal device and the access call control entity of the switching center over the established packet-switched session, via said first and second interworking entities.

2. The method according to claim 1, wherein the circuit-switched signaling messages comprise one or both of location update messages and mobility management messages.

3. The method according to claim 1, wherein said interworking comprises mapping circuit-switched signaling messages destined for the access call control entity to corresponding signaling messages that conform to a protocol for packet-switched sessions, and mapping signaling messages received from the second interworking entity to corresponding circuit-switched signaling messages.

4. The method according to claim 1, wherein said interworking comprises encapsulating circuit-switched signaling messages destined for the access call control entity within signaling messages that conform to a protocol for packet-switched sessions, and decapsulating signaling messages received from the second interworking entity to obtain circuit-switched signaling messages encapsulated therein.

5. The method according to claim 1, wherein said signaling messages for packet-switched sessions conform to one or both of the Session Initiation Protocol and the Session Initiation Protocol with encapsulated ISDN User Part.

6. A method implemented by a switching server for providing over a packet-switched session one or both of circuit-switched calls and services to a terminal device connected to the switching server via an Internet Protocol Multimedia Subsystem (IMS), the method comprising:
 using circuit-switched signaling messages at an access call control entity of the switching server, wherein the circuit-switched signaling messages conform to a protocol for providing said calls and services over a circuit-switched connection towards a service providing entity of the terminal device;
 interworking, at a second interworking entity comprised within the switching server, between said circuit-switched signaling messages and signaling messages that conform to a protocol for packet-switched sessions via the IMS, inversely to a first interworking entity at the terminal device;
 establishing a packet-switched session between the second interworking entity at the switching center and the first interworking entity at the terminal device;
 exchanging circuit-switched signaling messages between the switching center and the service providing entity of the terminal device over the established packet-switched session, via said first and second interworking entities.

7. The method according to claim 6, wherein the circuit-switched signaling messages comprise one or both of location update messages and mobility management messages.

8. The method according to claim 6, wherein said interworking comprises mapping circuit-switched signaling messages destined for the service providing entity to corresponding signaling messages that conform to a protocol for packet-switched sessions, and mapping signaling messages received from the first interworking entity to corresponding circuit-switched signaling messages.

9. The method according to claim 6, wherein said interworking comprises encapsulating circuit-switched signaling messages destined for the service providing entity within signaling messages that conform to a protocol for packet-switched sessions, and decapsulating signaling messages received from the first interworking entity to obtain circuit-switched signaling messages encapsulated therein.

10. The method according to claim 6, wherein said signaling messages for packet-switched sessions conform to one or both of the Session Initiation Protocol and the Session Initiation Protocol with encapsulated ISDN User Part.

11. The method according to claim 6, wherein the switching server comprises one or both of a mobile switching center server and a wireline telephony switching server.

12. The method according to claim 6, wherein the switching server comprises a soft switch.

13. The method according to claim 6, wherein the one or more circuit-switched access systems comprise one or more among GSM, UMTS, LTE, POTS and ISDN.

14. The method according to claim 6, further comprising applying predetermined control routines to one or both circuit-switched calls and services controlled through one or more circuit-switched access systems, and also applying said predetermined control routines to one or both circuit-switched calls and circuit-switched services controlled via one or both of said first interworking entity and said second interworking entity.

15. The method according to claim 6, further comprising interworking between user network interface circuit-switched signaling messages towards said access call control entity and user network interface signaling messages for packet-switched sessions towards said IMS.

16. A switching server configured to provide over a packet-switched session one or both of circuit-switched calls and services to a terminal device connected to the switching server via an Internet Protocol Multimedia Subsystem (IMS), the switching server comprising:
 networking hardware configured to operate as:
  an access call control entity that comprises a network side for interworking with other communication networks, and a signaling entity configured to exchange, through an access side, circuit-switched signaling messages related to circuit-switched connections with terminal devices communicating via one or more circuit-switched access systems, wherein the access call control entity is configured to handle one or both of circuit-switched calls and services provided over said circuit-switched connections to said terminal devices via said signaling entity; and
  an interfacing entity configured to:
   interface between said access side of said signaling entity and a terminal device connected to the switching server via said IMS;
   establish a packet-switched session between a second interworking entity at the switching center and a first interworking entity at the terminal device;
  the second interworking entity configured to:
   interwork between circuit-switched signaling messages for circuit-switched connections related to said signaling entity and signaling messages for packet-switched sessions related to said terminal connected to the switching server via said IMS, inversely to the first interworking entity at the terminal device;
   exchange circuit-switched signaling messages between the switching center and the terminal device over the established packet-switched session, via the second and first interworking entities.

17. The switching server of claim 16:
 wherein said access call control entity is configured for call control communication with terminal devices in accordance with one or more access control protocols associated with said one or more circuit-switched access systems;
 wherein said circuit-switched signaling messages, for which said second interworking entity is configured to interwork, conform to at least one of said one or more access control protocols.

18. The switching server of claim 17, wherein said one or more access control protocols comprise one or more of:
 Direct Transfer Application sub-Part protocol;
 Radio Access Network Application Part protocol;
 Base Station System Management Application sub-Part protocol; and
 ISDN User Part protocol.

19. The switching server of claim 16, wherein the circuit-switched signaling messages exchanged through the access side of the signaling entity comprise one or both of location update messages and mobility management messages.

20. The switching server of claim 16, wherein said second interworking entity is configured to interwork between user network interface circuit-switched signaling messages related to said signaling entity and user network interface signaling messages for packet-switched sessions related to said terminal device.

21. The switching server of claim 16, wherein said second interworking entity is configured to interwork by mapping circuit-switched signaling messages destined for the terminal device to corresponding signaling messages that conform to a protocol for packet-switched sessions, and mapping signaling messages received from the terminal device to corresponding circuit-switched signaling messages.

22. The switching server of claim 16, wherein said second interworking entity is configured to interwork by encapsulating circuit-switched signaling messages destined for the terminal device within signaling messages that conform to a protocol for packet-switched sessions, and decapsulating signaling messages received from the terminal device to obtain circuit-switched signaling messages encapsulated therein.

23. The switching server of claim 16, wherein said signaling messages for packet-switched sessions conform to one or both of the Session Initiation Protocol and the Session Initiation Protocol with encapsulated ISDN User Part.

24. The switching server of claim 16, comprising one or both of a mobile switching center server and a wireline telephony switching server.

25. The switching server of claim 16, comprising a soft switch.

26. The switching server of claim 16, wherein the circuit-switching access systems comprise one or more among GSM, UMTS, LTE, POTS and ISDN.

27. The switching server of claim 16, wherein the network side of the access call control entity is configured to interwork with one or both of circuit-switched signaling messages for circuit-switched connections and signaling sessions for packet-switched connections of other communication networks on a network to network interface.

28. The switching server of claim 16, wherein said access call control entity is configured to apply predetermined control routines to:
   one or both among circuit-switched calls and circuit-switched services controlled through said one or more access systems; and
   one or both among circuit-switched calls and circuit-switched services controlled via said interfacing entity.

29. The switching server of claim 16, wherein said access call control entity is configured to handle packet-switched voice communications via said interfacing entity.

30. The switching server of claim 16, wherein said one or more circuit-switched services include a text message service.

31. A terminal device configured to connect to a switching center via an Internet Protocol Multimedia Subsystem (IMS) for being provided one or both of circuit-switched calls and services over a packet-switched session, the terminal device comprising:
   networking hardware configured to:
      use circuit-switched signaling messages related to circuit-switched connections for one or both of said circuit-switched calls and services;
      terminate signaling messages related to packet-switched sessions via the IMS; and
      interwork, at a first interworking entity comprised within the terminal device, between the circuit-switched signaling messages and the signaling messages related to packet-switched sessions, inversely to a second interworking entity at the switching center;
      establish a packet-switched session between the first interworking entity at the terminal device and the second interworking entity at the switching center;
      exchange circuit-switched signaling messages between the terminal device and the switching center over the established packet-switched session, via the first and second interworking entities.

* * * * *